United States Patent
Tamura et al.

(10) Patent No.: US 10,714,790 B2
(45) Date of Patent: Jul. 14, 2020

(54) BATTERY, BATTERY PACK, ELECTRONIC DEVICE, ELECTRIC VEHICLE, ELECTRICITY STORAGE DEVICE AND ELECTRIC POWER SYSTEM

(71) Applicant: MURATA MANUFACTURING CO., LTD., Kyoto (JP)

(72) Inventors: Takashi Tamura, Kanagawa (JP); Norihito Kobayashi, Kanagawa (JP); Tadahiko Kubota, Tokyo (JP); Shuhei Sugita, Kanagawa (JP); Hiroki Mita, Kanagawa (JP); Kazumasa Takeshi, Tokyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 47 days.

(21) Appl. No.: 15/746,530

(22) PCT Filed: Jul. 7, 2016

(86) PCT No.: PCT/JP2016/003233
§ 371 (c)(1),
(2) Date: Jan. 22, 2018

(87) PCT Pub. No.: WO2017/017910
PCT Pub. Date: Feb. 2, 2017

(65) Prior Publication Data
US 2018/0219254 A1 Aug. 2, 2018

(30) Foreign Application Priority Data
Jul. 30, 2015 (JP) ................. 2015-151230

(51) Int. Cl.
*H01M 10/0565* (2010.01)
*H01M 4/38* (2006.01)
(Continued)

(52) U.S. Cl.
CPC ........ *H01M 10/0565* (2013.01); *H01M 2/16* (2013.01); *H01M 4/13* (2013.01);
(Continued)

(58) Field of Classification Search
CPC ........... H01M 10/0565; H01M 10/058; H01M 4/587; H01M 2/16; H01M 4/38; H01M 4/13; H01M 4/485
See application file for complete search history.

(56) References Cited

U.S. PATENT DOCUMENTS

2010/0216032 A1  8/2010  Baba et al.
2011/0117428 A1  5/2011  Lim et al.
(Continued)

FOREIGN PATENT DOCUMENTS

CN  102844928  12/2012
CN  103311481  9/2013
(Continued)

OTHER PUBLICATIONS

Machine Translation of JP-2002093463A (Year: 2002).*
(Continued)

*Primary Examiner* — Stewart A Fraser
(74) *Attorney, Agent, or Firm* — Sheridan Ross P.C.

(57) ABSTRACT

A battery, including: a positive electrode; a negative electrode; and an electrolyte layer containing a negative electrode active material.

21 Claims, 8 Drawing Sheets

(51) Int. Cl.
  *H01M 2/16* (2006.01)
  *H01M 4/13* (2010.01)
  *H01M 4/485* (2010.01)
  *H01M 10/058* (2010.01)
  *H01M 4/587* (2010.01)

(52) U.S. Cl.
  CPC ............ *H01M 4/38* (2013.01); *H01M 4/485* (2013.01); *H01M 4/587* (2013.01); *H01M 10/058* (2013.01)

(56) References Cited

U.S. PATENT DOCUMENTS

| | | | |
|---|---|---|---|
| 2012/0034529 A1* | 2/2012 | Tatsumisago | ............ H01B 1/06 429/322 |
| 2012/0251871 A1 | 10/2012 | Suzuki et al. | |
| 2012/0321962 A1 | 12/2012 | Kajita et al. | |
| 2013/0017454 A1 | 1/2013 | Sato et al. | |
| 2013/0122376 A1* | 5/2013 | Yokoyama | ........ H01M 10/0562 429/305 |
| 2013/0241497 A1* | 9/2013 | Meguro | .................. H01M 2/12 320/134 |
| 2015/0188106 A1 | 7/2015 | Takeshi et al. | |
| 2016/0028103 A1* | 1/2016 | Yokoyama | .......... H01M 10/056 429/304 |
| 2016/0336614 A1* | 11/2016 | Hatta | ...................... B60K 6/46 |
| 2017/0110760 A1* | 4/2017 | Hatta | ..................... B60L 58/14 |
| 2017/0162860 A1* | 6/2017 | Gaben | .................... C01B 25/45 |

FOREIGN PATENT DOCUMENTS

| | | |
|---|---|---|
| JP | 2001-214050 | 8/2001 |
| JP | 2002-093463 | 3/2002 |
| JP | 2005-135599 | 5/2005 |
| JP | 2006-049158 | 2/2006 |
| JP | 2007-258160 | 10/2007 |
| JP | 2008-047402 | 2/2008 |
| JP | 2011-130821 | 7/2011 |
| JP | 2012-209104 | 10/2012 |
| JP | 2013-191414 | 9/2013 |
| JP | 2015-128028 | 7/2015 |
| KR | 10-2013-0083828 | 7/2017 |
| WO | WO 2011/102453 | 8/2011 |
| WO | WO 2015/107910 | 7/2015 |

OTHER PUBLICATIONS

Official Action (no English translation available) for Japanese Patent Application No. 2015-151230, dated Nov. 7, 2018, 3 pages.
Official Action (no English translation available) for Japanese Patent Application No. 2015-151230, dated Mar. 12, 2019.
International Search Report prepared by the Japan Patent Office dated Sep. 15, 2016, for International Application No. PCT/JP2016/003233.
Official Action (no English translation available) for Chinese Patent Application No. 201680042991.7, dated Nov. 4, 2019, 9 pages.
Official Action (no English translation available) for Korean Patent Application No. 10-2017-7036338, dated Dec. 16, 2019, 6 pages.

* cited by examiner

A

B

BATTERY, BATTERY PACK, ELECTRONIC DEVICE, ELECTRIC VEHICLE, ELECTRICITY STORAGE DEVICE AND ELECTRIC POWER SYSTEM

CROSS REFERENCE TO RELATED APPLICATIONS

This application is a national stage application under 35 U.S.C. 371 and claims the benefit of PCT Application No. PCT/JP2016/003233 having an international filing date of 7 Jul. 2016, which designated the United States, which PCT application claimed the benefit of Japanese Patent Application No. 2015-151230 filed 30 Jul. 2015, the disclosures of which are incorporated herein by reference in their entirety.

TECHNICAL FIELD

The present technology relates to a battery, and a battery pack, an electronic device, an electric vehicle, an electric storage device, and a power system, including the battery.

BACKGROUND ART

Recently, a battery has been widely used as a power source of a mobile phone, a laptop computer, an electric tool, an electric automobile, and the like. The battery characteristics greatly depend on an electrode, an electrolyte, and a separator to be used, and thus, various technologies relevant to such members are proposed.

For example, the following technologies are proposed.

In Patent Document 1, a polyvinylidene fluoride copolymer is proposed as a polymer solid electrolyte in a gel electrolyte layer and an electrode structure, in order to improve ion conductivity or the like of the polymer solid electrolyte.

In Patent Document 2, an electrolyte layer includes a separator having insulating particles formed of a ceramic material or an organic polymer material is proposed, in order to improve heat resistance of the separator.

In Patent Document 3, a crosslinked polymer electrolyte wall formed of a conductive polymer composition is proposed.

CITATION LIST

Patent Document

Patent Document 1: Japanese Patent Application Laid-Open No. 11-130821
Patent Document 2: Japanese Patent Application Laid-Open No. 2007-258160
Patent Document 3: Japanese Patent Application Laid-Open No. 2001-214050

SUMMARY OF THE INVENTION

Problems to be Solved by the Invention

An object of the present technology is to provide a battery, in which cycle characteristics can be improved, and a battery pack, an electronic device, an electric vehicle, an electric storage device, and a power system, including the battery.

Solutions to Problems

To achieve the above object, the present technology provides a battery, including: a positive electrode; a negative electrode; and an electrolyte layer containing a negative electrode active material.

A battery pack, an electronic device, an electric vehicle, an electric storage device, and a power system of the present technology include the battery described above.

Effects of the Invention

As described above, according to the present technology, it is possible to improve cycle characteristics.

MODE FOR CARRYING OUT THE INVENTION

Embodiments of the present technology will be described in the following order.
1 First Embodiment (Example of Cylindrical Battery)
2 Second Embodiment (Example of Laminated Film Type Battery)
3 Third Embodiment (Example of Battery Pack and Electronic Device)
4 Fourth Embodiment (Example of Electric Storage System)
5 Fifth Embodiment (Example of Electric Vehicle)

1. First Embodiment

[Configuration of Battery]

Figure 1:
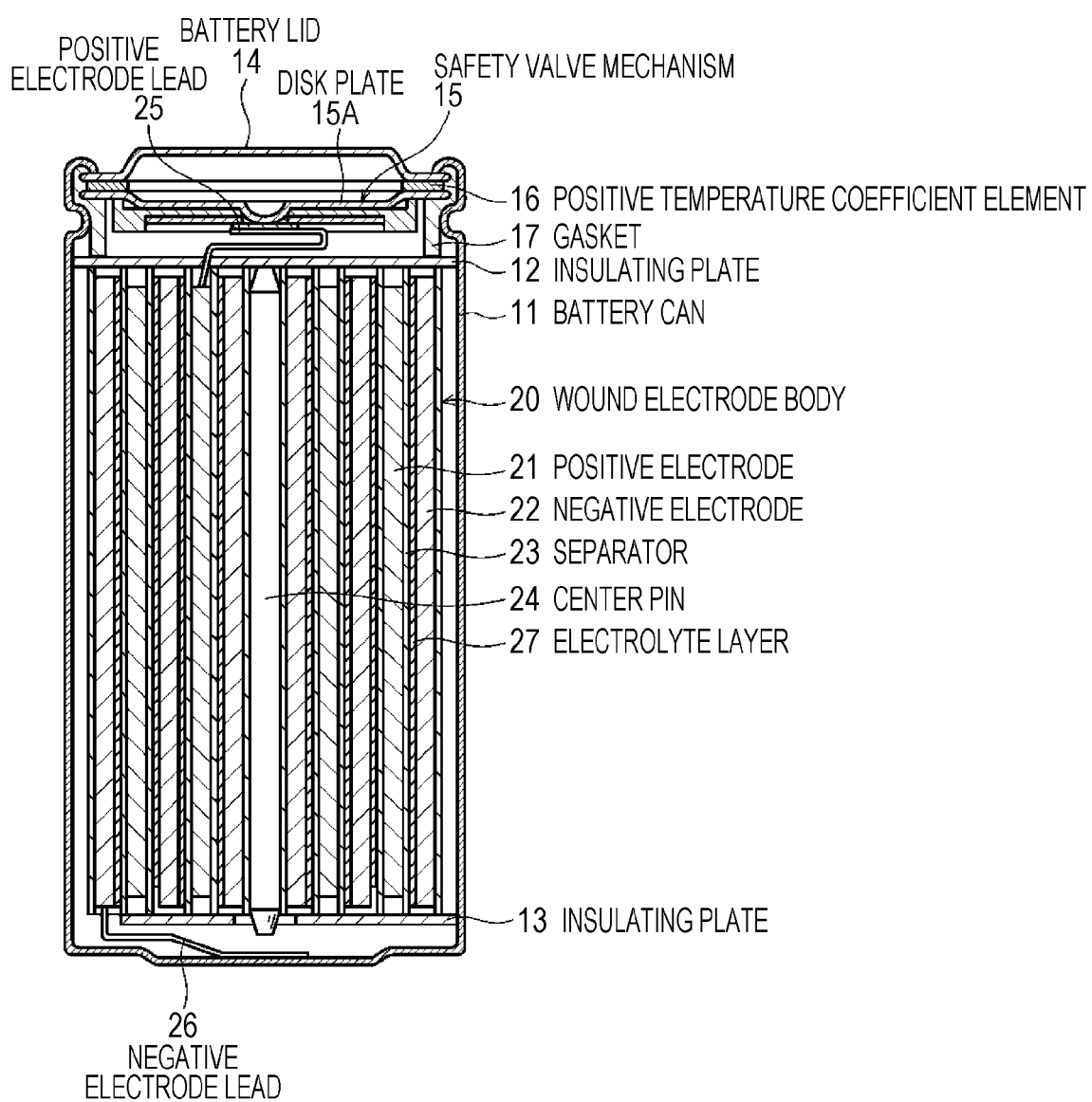
FIG. 1 is a sectional view illustrating a configuration example of a non-aqueous electrolyte secondary battery according to a first embodiment of the present technology.

Hereinafter, a configuration example of a non-aqueous electrolyte secondary battery (hereinafter, simply referred to as a "battery") according to a first embodiment of the present technology will be described with reference to FIG. 1. The battery, for example, is a lithium ion secondary battery in which the capacitance of a negative electrode is represented by a capacitance component according to absorption and discharge of lithium (Li), which is an electrode reactant. The battery is a so-called cylindrical battery, and includes a wound electrode body 20 in which a pair of a strip-like positive electrode 21 and a strip-like negative electrode 22 are laminated through a separator 23 and are wound, in an approximately hollow cylindrical battery can 11.

An electrolyte layer 27 is disposed as a polymer layer between the negative electrode 22 and the separator 23. The electrolyte layer 27 is disposed to be adjacent to the negative electrode 22, and is separated from the positive electrode 21 through the separator 23.

The battery can 11 is configured of iron (Fe) plated with nickel (Ni), and in battery can 11, the one end portion is closed, and the other end portion is opened. In the battery can 11, an electrolytic solution is injected as a liquid electrolyte, and is impregnated into the positive electrode 21, the negative electrode 22, and the separator 23. In addition, the electrolytic solution is retained in the electrolyte layer 27. A pair of insulating plates 12 and 13 are respectively and vertically disposed with respect to a winding circumferential surface in order to interpose the wound electrode body 20 therebetween.

A battery lid 14, and a safety valve mechanism 15 and a positive temperature coefficient element (a PTC element) 16, which are disposed in the battery lid 14, are attached to an open end portion of the battery can 11 by being tightened through a sealing gasket 17. With this arrangement, the battery can 11 is sealed. The battery lid 14, for example, is configured of a material similar to that of the battery can 11. The safety valve mechanism 15 is electrically connected to the battery lid 14, and in the case of internal short-circuit or in a case where an internal pressure of the battery is greater than or equal to a certain level due to heating or the like from the outside, a disk plate 15A is reversed, and thus, cuts electric connection between the battery lid 14 and the wound electrode body 20. The sealing gasket 17, for example, is configured of an insulating material, and in the sealing gasket 17, a front surface is coated with asphalt.

For example, a center pin 24 is inserted into the center of the wound electrode body 20. A positive electrode lead 25 formed of aluminum (Al) or the like is connected to the positive electrode 21 of the wound electrode body 20, and a negative electrode lead 26 formed of nickel or the like is connected to the negative electrode 22. The positive electrode lead 25 is welded to the safety valve mechanism 15, and thus, is electrically connected to the battery lid 14, and the negative electrode lead 26 is welded to the battery can 11, and thus, is electrically connected to the battery lid 14.

Figure 2:
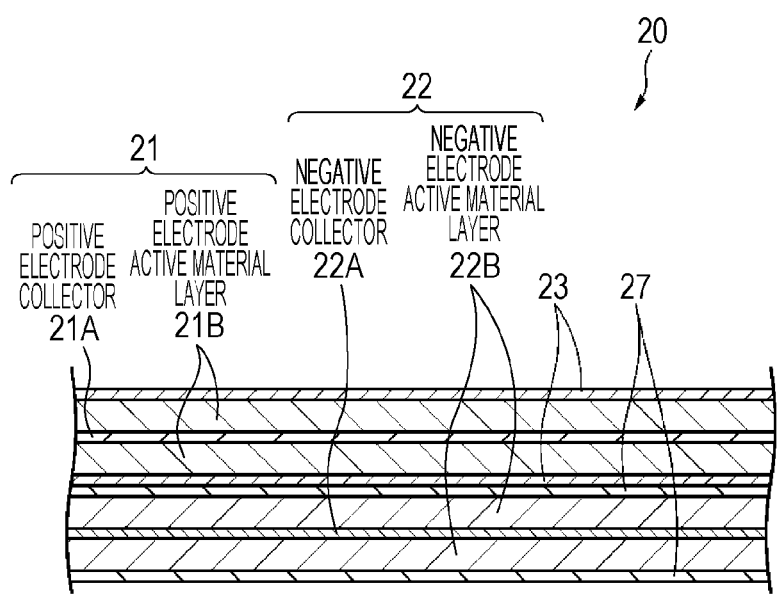
FIG. 2 is a sectional view enlargedly illustrating a part of a wound electrode body illustrated in FIG. 1.

Hereinafter, the positive electrode 21, the negative electrode 22, the separator 23, the electrolytic solution, and the electrolyte layer 27, configuring the battery, will be described in the order, with reference to FIG. 2.

(Positive Electrode)

The positive electrode 21, for example, has a structure in which a positive electrode active material layer 21B is disposed on both surfaces of a positive electrode collector 21A. Furthermore, even though it is not illustrated, the positive electrode active material layer 21B may be disposed on only one surface of the positive electrode collector 21A.

The positive electrode collector 21A, for example, is configured of a metal foil such as an aluminum foil, a nickel foil, or a stainless foil. The positive electrode active material layer 21B, for example, contains a positive electrode active material capable of absorbing and discharging lithium, which is an electrode reactant. The positive electrode active material layer 21B may further contain an additive agent, as necessary. For example, at least one type of a conductive agent and a binder can be used as the additive agent.

(Positive Electrode Active Material)

For example, a lithium-containing compound such as an interlayer compound containing a lithium oxide, a lithium phosphorus oxide, a lithium sulfide, or lithium is suitable as the positive electrode active material capable of absorbing and discharging lithium, and two or more types thereof may be used by being mixed. In order to increase energy density, a lithium-containing compound containing lithium, a transition metal element, and oxygen (O) is preferable. Examples of such a lithium-containing compound include a lithium composite oxide having a layered rock salt type structure represented by Formula (A), and a lithium composite phosphate having an olivine type structure represented by Formula (B), and the like. It is more preferable that the lithium-containing compound contains at least one type of a group consisting of cobalt (Co), nickel, manganese (Mn), and iron, as the transition metal element. Examples of such a lithium-containing compound include a lithium composite oxide having a layered rock salt type structure represented by Formula (C), Formula (D), or Formula (E), a lithium composite oxide having a spinel type structure represented by Formula (F), a lithium composite phosphate having an olivine type structure represented by Formula (G), or the like, and specifically, include $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), or the like.

$$Li_pNi_{(1-q-r)}Mn_qM1_rO_{(2-y)}X_z \qquad (A)$$

(Here, in Formula (A), M1 represents at least one type of an element selected from the group 2 to the group 15 except for nickel and manganese. X represents at least one type of the group 16 and the group 17 except for oxygen. p, q, y, and z are values within ranges of 0≤p≤1.5, 0≤q≤1.0, 0≤r≤1.0, −0.10≤y≤0.20, and 0≤z≤0.2.)

$$Li_aM2_bPO_4 \qquad (B)$$

(Here, in Formula (B), M2 represents at least one type of an element selected from the group 2 to the group 15. a and b are values within ranges of 0≤a≤2.0 and 0.5≤b≤2.0.)

$$Li_fMn_{(1-g-h)}Ni_gM3_hO_{(2-j)}F_k \qquad (C)$$

(Here, in Formula (C), M3 represents at least one type of a group consisting of cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W). f, g, h, j, and k are values within ranges of 0.8≤f≤1.2, 0<g<0.5, 0≤h≤0.5, g+h<1, −0.1≤j≤0.2, and 0≤k≤0.1. Furthermore, the composition of lithium is different according to charge and discharge states, and the value of f represents a value in a fully discharged state.)

$$Li_mNi_{(1-n)}M4_nO_{(2-p)}F_q \qquad (D)$$

(Here, in Formula (D), M4 represents at least one type of a group consisting of cobalt, manganese, magnesium, aluminum, boron, titanium, vanadium, chromium, iron, copper, zinc, molybdenum, tin, calcium, strontium, and tungsten. m, n, p, and q are values within ranges of 0.8≤m≤1.2, 0.005≤n≤0.5, −0.1≤p≤0.2, and 0≤q≤0.1. Furthermore, the composition of lithium is different according to charge and discharge states, and the value of m represents a value in a fully discharged state.)

$$Li_rCo_{(1-s)}M5_sO_{(2-t)}F_u \qquad (E)$$

(Here, in Formula (E), M5 represents at least one type of a group consisting of nickel, manganese, magnesium, aluminum, boron, titanium, vanadium, chromium, iron, copper, zinc, molybdenum, tin, calcium, strontium, and tungsten. r, s, t, and u are values within ranges of 0.8≤r≤1.2, 0≤s<0.5, −0.1≤t≤0.2, and 0≤u≤0.1. Furthermore, the composition of lithium is different according to charge and discharge states, and the value of r represents a value in a fully discharged state.)

$$Li_vMn_{2-w}M6_wO_xF_y \quad (F)$$

(Here, in Formula (F), M6 represents at least one type of a group consisting of cobalt, nickel, magnesium, aluminum, boron, titanium, vanadium, chromium, iron, copper, zinc, molybdenum, tin, calcium, strontium, and tungsten. v, w, x, and y are values within ranges of $0.9 \leq v \leq 1.1$, $0 \leq w \leq 0.6$, $3.7 \leq x \leq 4.1$, and $0 \leq y \leq 0.1$. Furthermore, the composition of lithium is different according to charge and discharge states, and the value of v represents a value in a fully discharged state.)

$$Li_zM7PO_4 \quad (G)$$

(Here, in Formula (G), M7 represents at least one type of a group consisting of cobalt, manganese, iron, nickel, magnesium, aluminum, boron, titanium, vanadium, niobium (Nb), copper, zinc, molybdenum, calcium, strontium, tungsten, and zirconium. z is a value within a range of $0.9 \leq z \leq 1.1$. Furthermore, the composition of lithium is different according to charge and discharge states, and the value of z represents a value in a fully discharged state.)

Examples of the positive electrode active material capable of absorbing and discharging lithium also include an inorganic compound not containing lithium, such as $MnO_2$, $V_2O_5$, $V_6O_{13}$, NiS, and MoS, in addition to the materials described above.

The positive electrode active material capable of absorbing and discharging lithium may be other than the materials described above. In addition, two or more types of the positive electrode active material exemplified in the above description may be mixed at an arbitrary combination.

(Binder)

For example, at least one type selected from a resin material such as polyvinylidene fluoride (PVdF), polytetrafluoroethylene (PTFE), polyacrylonitrile (PAN), styrene butadiene rubber (SBR), and carboxy methyl cellulose (CMC), and a copolymer mainly containing the resin material is used as the binder.

(Conductive Agent)

Examples of the conductive agent include a carbon material such as graphite, carbon black, or Ketjen black, and one type or two or more types thereof may be used by being mixed. In addition, a metal material, a conductive polymer material, or the like may be used in addition to the carbon material, insofar as the material has conductivity.

(Negative Electrode)

The negative electrode 22, for example, has a structure in which a negative electrode active material layer 22B is disposed on both surfaces of a negative electrode collector 22A. Furthermore, even though it is not illustrated, the negative electrode active material layer 22B may be disposed on only one surface of the negative electrode collector 22A. The negative electrode collector 22A, for example, is configured of a metal foil such as a copper foil, a nickel foil, or a stainless foil.

The negative electrode active material layer 22B contains one type or two or more types of a negative electrode active material capable of absorbing and discharging lithium. The negative electrode active material layer 22B may further contain an additive agent such as a binder or a conductive agent, as necessary.

Furthermore, in the non-aqueous electrolyte battery, an electrochemical equivalent of a negative electrode 54 or the negative electrode active material is greater than an electrochemical equivalent of the positive electrode 21, and theoretically, it is preferable that a lithium metal is not precipitated in the negative electrode 22 in the middle of charge.

(Negative Electrode Active Material)

Examples of the negative electrode active material include a carbon material such as non-graphitizable carbon, graphitizable carbon, graphite, pyrolytic carbons, cokes, glass type carbons, an organic polymer compound sintered body, a carbon fiber, or active carbon. Among them, the cokes include pitch coke, needle coke, petroleum coke, or the like. The organic polymer compound sintered body represents that a polymer material such as a phenolic resin or a furan resin is sintered at a suitable temperature, and is carbonized, and a part thereof is classified into non-graphitizable carbon or graphitizable carbon. Such a carbon material is preferable since a change in a crystal structure, which occurs at the time of charge and discharge, is extremely small, high charge and discharge capacitance can be obtained, and excellent cycle characteristics can be obtained. In particular, graphite is preferable since an electrochemical equivalent is large, and a high energy density can be obtained. In addition, non-graphitizable carbon is preferable since excellent cycle characteristics can be obtained. In addition, a material of which a charge and discharge potential is low, and specifically, a charge and discharge potential is close to that of a lithium metal, is preferable since a high energy density of the battery can be easily realized.

In addition, examples of the other negative electrode active material capable of obtaining high capacitance, also include a material containing at least one type of a metal element and a semimetal element as a configuration element (for example, an alloy, a compound, or a mixture). This is because a high energy density can be obtained in a case where such a material is used. In particular, it is more preferable that such a material is used along with the carbon material since a high energy density can be obtained, and excellent cycle characteristics can be obtained. Furthermore, in the present technology, the alloy includes an alloy containing one or more types of a metal element and one or more types of a semimetal element, in addition to an alloy formed of two or more types of the metal element. In addition, the alloy may include an alloy containing a non-metal element. In such a structure, a solid solution, a eutectic (a eutectic mixture), an intermetallic compound, or two or more types thereof exist together.

Examples of the negative electrode active material include a metal element or a semimetal element, which is capable of forming an alloy with the lithium. Specifically, examples of the negative electrode active material include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), or platinum (Pt). Such negative electrode active material may be a crystalline material or an amorphous material.

A material containing a metal element or a semimetal element of the group 4B in a short-period periodic table as a configuration element is preferable, and a material containing at least one of silicon and tin as a configuration element is more preferable, as the negative electrode active material. This is because silicon and tin have a high capacity of absorbing and discharging lithium, and are capable of obtaining a high energy density. Examples of such a negative electrode active material include a single body, an alloy, or a compound of silicon, a single body, an alloy, or a compound of tin, and a material containing a combination of one type or two or more types thereof in at least a part thereof.

Examples of the alloy of silicon include an alloy containing at least one type of a group consisting of tin, nickel, copper, iron, cobalt, manganese, zinc, indium, silver, titanium, germanium, bismuth, antimony (Sb), and chromium, as a second configuration element other than silicon. Examples of the alloy of tin include an alloy containing at least one type of a group consisting of silicon, nickel, copper, iron, cobalt, manganese, zinc, indium, silver, titanium, germanium, bismuth, antimony, and chromium as a second configuration element other than tin.

Examples of the compound of tin or the compound of silicon include a compound containing oxygen or carbon, and the compound may contain the second configuration element described above in addition to tin or silicon.

Among them, SnCoC-containing material in which cobalt, tin, and carbon are contained as a configuration element, a content of carbon is greater than or equal to 9.9 mass % and less than or equal to 29.7 mass %, and a ratio of cobalt to the total of tin and cobalt is greater than or equal to 30 mass % and less than or equal to 70 mass % is preferable as an Sn-based negative electrode active material. This is because in such a composition range, a high energy density can be obtained, and excellent cycle characteristics can be obtained.

The SnCoC-containing material may further contain other configuration elements, as necessary. For example, silicon, iron, nickel, chromium, indium, niobium, germanium, titanium, molybdenum, aluminum, phosphorus (P), gallium, or bismuth is preferable as the other configuration element, and two or more types thereof may be contained in the other configuration element. This is because it is possible to further improve the capacitance or the cycle characteristics.

Furthermore, it is preferable that the SnCoC-containing material contains a combination of tin, cobalt, and carbon, and the combination has a structure having low crystallinity or an amorphous structure. In addition, in the SnCoC-containing material, it is preferable that at least a part of carbon, which is a configuration element, is combined with a metal element or a semimetal element, which is the other configuration element. This is because even though it is considered that the cycle characteristics are degraded due to aggregation or crystallization of tin or the like, it is possible to suppress the aggregation or the crystallization by combining carbon with other elements.

Examples of a measurement method of examining a combined state of the elements include an X-ray photoelectron spectroscopy (XPS). In the XPS, in the case of graphite, a peak of a is orbit (C1s) of carbon appears at 284.5 eV in a device where energy calibration is performed such that a peak of a 4f orbit (Au4f) of a gold atom is obtained at 84.0 eV. In addition, in the case of front surface-contaminated carbon, a peak of an is orbit (C1s) of carbon appears at 284.8 eV. In contrast, in a case where an electric charge density of a carbon element increases, for example, the peak of C1s appears in a region lower than 284.5 eV, in a case where carbon is combined with a metal element or a semimetal element. That is, in a case where a peak of C1s of a synthetic wave obtained from the SnCoC-containing material appears in a region lower than 284.5 eV, at least a part of carbon contained in the SnCoC-containing material is combined with a metal element or a semimetal element, which is the other configuration element.

Furthermore, in the XPS measurement, for example, the peak of C1s is used for correcting an energy axis of a spectrum. In general, the front surface-contaminated carbon exists on a front surface, and thus, the peak of C1s of the front surface-contaminated carbon is set to 284.8 eV, and is set to the energy standard. In the XPS measurement, a waveform of the peak of C1s is obtained as a form having the peak of the front surface-contaminated carbon and a peak of carbon in the SnCoC-containing material, and thus, for example, the peak of the front surface-contaminated carbon is separated from the peak of carbon in the SnCoC-containing material by performing analysis by using commercially available software. In the analysis of the waveform, a position of a main peak existing on a minimum bound energy side is set to the energy standard (284.8 eV).

Examples of the other negative electrode active material include a metal oxide, a polymer compound, or the like, capable of absorbing and discharging lithium. Examples of the metal oxide include a lithium titanium oxide containing titanium and lithium, such as lithium titanate ($Li_4Ti_5O_{12}$), iron oxide, ruthenium oxide, molybdenum oxide, or the like. Examples of the polymer compound include polyacethylene, polyaniline, polypyrrole, or the like.

(Binder)

For example, at least one type selected from a resin material such as polyvinylidene fluoride, polytetrafluoroethylene, polyacrylonitrile, styrene butadiene rubber, and carboxymethyl cellulose, and a copolymer containing the resin materials as a main component is used as the binder.

(Conductive Agent)

A carbon material or the like similar to the positive electrode active material layer 21B can be used as the conductive agent.

(Separator)

The separator 23 isolates the positive electrode 21 from the negative electrode 22, and allows a lithium ion to pass therethrough while preventing short-circuit of a current due to contact between both electrodes. The separator 23, for example, is configured of a resin porous film, such as polytetrafluoroethylene, polypropylene, or polyethylene, and may have a structure in which two or more types of the porous film are laminated. Among them, a polyolefin porous film is preferable since a short-circuit protection effect is excellent, and battery safety due to a shut down effect can be improved. In particular, polyethylene is capable of obtaining a shut down effect in a range of higher than or equal to 100° C. and lower than or equal to 160° C., and has excellent electrochemical stability, and thus, is preferable as the material configuring the separator 23. In addition, a material can be used in which a resin having chemical stability is copolymerized or blended with polyethylene or polypropylene. Alternatively, the porous film may have a structure of three or more layers in which a polypropylene layer, a polyethylene layer, and a polypropylene layer are laminated in the order.

In addition, in the separator 23, a resin layer may be disposed on one surface or both surfaces of the porous film, which is a base material. The resin layer is a porous matrix resin layer on which an inorganic substance is supported. With this arrangement, it is possible to obtain oxidation resistance, and to suppress degradation in the separator 23. For example, polyvinylidene fluoride, hexafluoropropylene (HFP), polytetrafluoroethylene, and the like can be used as the matrix resin, and a copolymer thereof can also be used.

Examples of the inorganic substance include metal, semiconductor, or an oxide and a nitride thereof. For example, aluminum, titanium, and the like can be exemplified as the metal, and silicon, boron, and the like can be exemplified as the semiconductor. In addition, it is preferable that the inorganic substance does not have conductivity substantially, and has large thermal capacitance. This is because in a case where the thermal capacitance is large, the inorganic substance is useful as a heatsink at the time of generating the heat of a current, and is capable of suppressing a thermal runway of a battery. Examples of such an inorganic substance include an oxide or nitride, such as alumina ($Al_2O_3$), boehmite (monohydrate of alumina), talc, boron nitride (BN), aluminum nitride (AlN), titanium dioxide ($TiO_2$), and silicon oxide ($SiO_x$). Furthermore, the inorganic substance described above may be contained in the porous film as the base material.

It is preferable that a particle diameter of the inorganic substance is in a range of 1 nm to 10 µm. In a case where the particle diameter of the inorganic substance is less than 1 nm, it is hard to obtain the inorganic substance, or it is not suitable in cost even in a case where the inorganic substance can be obtained. In a case where the particle diameter of the inorganic substance is greater than 10 µm, a distance between the electrodes increases, an active material filling amount is not sufficiently obtained in a limited space, and battery capacitance decreases.

The resin layer, for example, can be formed as follows. That is, slurry formed of a matrix resin, a solvent, and an inorganic substance is applied onto a base material (the porous film), and is subjected to phase separation bypassing through a poor solvent bath of the matrix resin and a good solvent bath of the solvent, and then, is dried.

(Electrolytic Solution)

The electrolytic solution impregnated into the positive electrode active material layer 21A, the negative electrode active material layer 22B, and the separator 23 contains a solvent, and an electrolytic salt which is dissolved in the solvent. The electrolytic solution may contain a known additive agent in order to improve battery characteristics.

Cyclic ester carbonate such as ethylene carbonate or propylene carbonate can be used as the solvent, and it is preferable that one, in particular, both of ethylene carbonate and propylene carbonate are used by being mixed, as the solvent. This is because it is possible to improve the cycle characteristics.

In addition to cyclic carbonate ester, it is preferable that chain carbonate ester such as diethyl carbonate, dimethyl carbonate, ethyl methyl carbonate, or methyl propyl carbonate may be used by being mixed, as the solvent. This is because it is possible to obtain high ion conductivity.

In addition, it is preferable that 2,4-difluoroanisole or vinylene carbonate is contained as the solvent. This is because 2,4-difluoroanisole is capable of improving discharge capacitance, and vinylene carbonate is capable of improving the cycle characteristics. Accordingly, it is preferable that such materials are used by being mixed since the discharge capacitance and the cycle characteristics can be improved.

In addition, examples of the solvent include butylene carbonate, γ-butyrolactone, γ-valerolactone, 1,2-dimethoxy ethane, tetrahydrofuran, 2-methyl tetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethyl formamide, N-methyl pyrrolidinone, N-methyl oxazolidinone, N,N-dimethyl imidazolidinone, nitromethane, nitroethane, sulfolane, dimethyl sulfoxide, phosphate trimethyl, or the like.

Furthermore, there is a case where a compound in which hydrogen of at least a part the non-aqueous solvents is substituted with fluorine, is preferable since there is a case where the reversibility of an electrode reaction can be improved according to the type of electrode to be combined.

Examples of the electrolytic salt include a lithium salt, and one type of the lithium salt can be independently used, or two or more types thereof may be used by being mixed. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxalato-O,O']lithium borate, lithium bisoxalate borate, LiBr, or the like. Among them, $LiPF_6$ is preferable since it is possible to obtain high ion conductivity, and to improve the cycle characteristics.

(Electrolyte Layer)

The electrolyte layer 27 contains a polymer compound, a negative electrode active material, and an electrolytic solution. The electrolyte layer 27 may further contain one or both of an insulating material and a conductive assistant. In a case where the electrolyte layer 27 further contains the insulating material, it is possible to improve heat resistance of the battery. On the other hand, in a case where the electrolyte layer 27 further contains the conductive assistant, it is possible to improve the conductivity of the electrolyte layer 27.

The electrolyte layer 27 functions as a field for ion migration between the positive electrode 21 and the negative electrode 22, and has a configuration capable of retaining a negative electrode active material and an electrolytic solution. A polymer compound becomes a retainer retaining the negative electrode active material and the electrolytic solution, and is swelled by the electrolytic solution. The polymer compound swelled by the electrolytic solution may be in the shape of gel. That is, the electrolyte layer 27 may be a gel electrolyte layer. The thickness of the electrolyte layer 27 is not particularly limited, and for example, is 0.1 µm to 15 µm.

The electrolyte layer 27, for example, is formed on both surfaces of the negative electrode 22 or a surface of the separator 23 facing the negative electrode 22. Specifically, for example, the electrolyte layer 27 is obtained by applying a solution for forming an electrolyte layer or a solution for forming a polymer layer onto both surfaces of the negative electrode 22, or the surface of the separator 23 facing the negative electrode 22.

It is preferable that an electrolyte similar to the electrolyte configuring the electrolyte layer 27 exists in a void such as a fine pore of the negative electrode active material layer 22B. This is because it is difficult for the negative electrode active material to be isolated, and thus, excellent cycle characteristics are obtained.

The electrolyte layer 27 may further include a film disposed on a side at which an interface with respect to the negative electrode 22 is formed. The film is a so-called solid electrolyte interface (SEI), and is derived from an electrolytic solution (specifically, a solvent, an additive agent, or the like contained in the electrolytic solution). Here, the electrolytic solution indicates at least one type of the electrolytic solution retained in the electrolyte layer 27, and the electrolytic solution impregnated into the positive electrode 21, the negative electrode 22, and the separator 23.

(Polymer Compound)

It is preferable that the polymer compound contains fluorine (F) as a configuration element from the viewpoint of high physical strength and electrochemical stability. The type of polymer compound containing fluorine as a configuration element is not particularly limited insofar as the polymer compound is a polymer containing fluorine as a configuration element. Among them, it is preferable that the polymer compound contains one type or two or more types of a polymer containing vinylidene fluoride as a component, and more specifically, a homopolymer and a copolymer of vinylidene fluoride. This is because excellent physical strength and excellent electrochemical stability are obtained.

The "homopolymer" is a polymer containing one type of a monomer as a polymerization component. The homopolymer of vinylidene fluoride is polyvinylidene fluoride.

The "copolymer" is a polymer containing two or more monomers as a polymerization component. The type of the monomer forming vinylidene fluoride and the copolymer is not particularly limited, and for example, is at least one type of hexafluoropropylene, chlorotrifluoroethylene, tetrafluoroethylene, a monomethyl maleic acid, and the like. Specific examples of the copolymer of vinylidene fluoride include a copolymer of vinylidene fluoride and hexafluoropropylene, a copolymer of vinylidene fluoride and tetrafluoroethylene, a copolymer of vinylidene fluoride and chlorotrifluoroethylene, a copolymer of vinylidene fluoride, hexafluoropropylene, and tetrafluoroethylene, a copolymer of vinylidene fluoride, hexafluoropropylene, and chlorotrifluoroethylene, a copolymer in which other ethylenically unsaturated monomers are copolymerized, or the like. The content (a copolymerization amount) of each polymerization component in the copolymer is not particularly limited.

Furthermore, the polymer compound may contain one type or two or more types of other homopolymers and other copolymers along with one type or two or more types of the homopolymer and the copolymer of vinylidene fluoride. The "other homopolymer" described herein is a homopolymer not containing fluorine as a configuration element, and the "other copolymer" is a copolymer not containing fluorine as a configuration element.

Specific examples of the other homopolymer include polyacrylonitrile, polyethylene oxide, polypropylene oxide, polyphosphazene, polysiloxane, polyvinyl acetate, polyvinyl alcohol, polymethyl methacrylate, a polyacrylic acid, a polymethacrylic acid, styrene-butadiene rubber, nitrile-butadiene rubber, polystyrene, polycarbonate, and the like.

Specific examples of the other copolymer include a copolymer or the like containing two or more types of the specific example of other homopolymer described above as a polymerization component.

polyacrylonitrile, polyethylene oxide, polymethyl methacrylate, polyvinyl chloride, or a derivative thereof can be used as the polymer compound, in addition to the polymer compound containing fluorine (F) described above as a configuration element.

(Negative Electrode Active Material)

A material similar to the negative electrode active material contained in the negative electrode active material layer 22B described above can be exemplified as the negative electrode active material. Furthermore, the negative electrode active material is not limited to the materials exemplified as the negative electrode active material contained in the negative electrode active material layer 22B described above, and any negative electrode active material can be used insofar as the negative electrode active material is generally used in a lithium ion battery or the like.

Specifically, the negative electrode active material contains at least one type of a carbon material, a metal, a semimetal, a metal oxide, a semimetal oxide, and a polymer compound. More specifically, for example, the negative electrode active material may contain at least one type of a carbon material, silicon, tin, and lithium titanate. Silicon may be contained in the negative electrode active material as a silicon single body, a silicon-containing alloy, a silicon oxide, or the like. Tin may be contained in the negative electrode active material as a tin single body, a tin-containing alloy, a tin oxide, or the like. In a case where the negative electrode active material contains the carbon material, the carbon material, for example, is graphite having a specific surface area of greater than or equal to 0.1 $m^2/g$ and less than or equal to 50 $m^2/g$. Examples of such graphite having a specific surface area include artificial graphite, natural graphite, and the like, but are not limited thereto. The specific surface area can be obtained from a Brunauer-Emmett-Teller method (a BET method) after the electrolyte layer 27 is dissolved in a solvent, and graphite as the negative electrode active material is extracted.

The negative electrode active material contained in the electrolyte layer 27 may have the same composition as that of the negative electrode active material contained in the negative electrode active material layer 22B described above, or may have a different composition. Here, the "same composition" represents that the configuration elements of the negative electrode active materials contained in the electrolyte layer 27 and the negative electrode active material layer 22B are the same, and atomic ratios of the configuration elements are the same. On the other hand, the "different composition" represents that the configuration elements of the negative electrode active materials contained in the electrolyte layer 27 and the negative electrode active material layer 22B are different from each other, or the configuration elements of the negative electrode active materials contained in the electrolyte layer 27 and the negative electrode active material layer 22B are the same, but the atomic ratios of the configuration elements are different from each other. In the negative electrode active materials contained in the electrolyte layer 27 and the negative electrode active material layer 22B, average particle diameters, particle size distributions, particle shapes, or the like may be different from each other, or may be the same.

The negative electrode active material is a powder, and for example, is dispersed in the electrolyte layer 27. The distribution of the negative electrode active material is not particularly limited, and the negative electrode active material may be homogeneously or inhomogeneously distributed in a thickness direction of the electrolyte layer 27, or may be homogeneously or inhomogeneously distributed in an in-plane direction of the electrolyte layer 27.

In a case where the negative electrode active material is inhomogeneously distributed in the thickness direction of the electrolyte layer 27, it is preferable that a concentration distribution of the negative electrode active material is maximized in the interface on the negative electrode 21 side or in the vicinity thereof, and decreases as being separated from the negative electrode 22 side. This is because it is possible to further improve electric conductivity of the negative electrode active material layer 22B.

A mixing ratio (a weight ratio) between the polymer compound and the negative electrode active material is not particularly limited. Among them, a ratio of the mass of the negative electrode active material to the mass of the polymer compound (the mass of the negative electrode active material/the mass of the polymer compound) is preferably 1/1000 to 4/1, is more preferably 1/1000 to 2/1, and is further more preferably 1/100 to 1/1. This is because the electrolyte layer 27 is easily and stably formed, and sufficient electric conductivity is obtained.

Specifically, in a case where the ratio is less than 1/1000, an absolute amount of the negative electrode active material is not sufficient, and thus, it is difficult to form a conductive path (an electronic conduction path) due to the negative electrode active material in the electrolyte layer 27. With this arrangement, there is a possibility that electric conductivity of the electrolyte layer 27 does not sufficiently increase. On the other hand, in a case where the ratio is greater than 4/1, the absolute amount of the negative electrode active material is excessive, and thus, there is a possibility that the negative electrode active material is not sufficiently dispersed in the electrolyte layer 27.

(Electrolytic Solution)

An electrolytic solution similar to the electrolytic solution impregnated into the positive electrode 21, the negative electrode 22, and the separator 23 can be exemplified as the electrolytic solution retained in the electrolyte layer 27. Furthermore, the electrolytic solution is not limited to the electrolytic solution exemplified as the electrolytic solution described above, and an electrolytic solution can be used insofar as the electrolytic solution is generally used in a lithium ion battery or the like.

The electrolytic solution retained in the electrolyte layer 27 and the electrolytic solution impregnated into the positive electrode 21, the negative electrode 22, and the separator 23 may be the same type, or may be different types.

(Conductive Assistant)

The conductive assistant is a powder, and for example, is dispersed in the electrolyte layer 27. The type of conductive assistant is not particularly limited insofar as the conductive assistant is a material having conductivity. Among them, it is preferable that the conductive assistant is a carbon material. This is because the carbon material is electrochemically stable, and has high electric conductivity.

For example, a spherical conductive assistant (a carbon material) such as carbon black, acethylene black, and Ketjen black, a fiber-like conductive assistant (a carbon material) such as a carbon nanotube or a gas phase method carbon fiber (VGCF), and the like can be used as the conductive assistant. A conductive assistant other than the carbon material described above may be used, and for example, a metal material, a conductive polymer, and the like may be used. One type of the carbon material, the metal material, and the conductive polymer may be independently used, or two or more types thereof may be used by being combined.

(Insulating Material)

The insulating material is a powder, and for example, is dispersed in the electrolyte layer 27. The powder of the insulating material may contain one type of insulating particles, or may contain two or more types of the insulating particles. The insulating material, for example, is at least one type of a metal oxide, a metal nitride, a metal oxide hydrate, a metal hydroxide, a metal carbide, a metal sulfide, and the like. The metal oxide, for example, is aluminum oxide ($Al_2O_3$), titanium oxide ($TiO_2$), magnesium oxide (MgO), zirconium oxide ($ZrO_2$), silicon oxide ($SiO_2$), yttrium oxide ($Y_2O_3$), zinc oxide (ZnO), and the like. The metal nitride, for example, is aluminum nitride (AlN), silicon nitride ($Si_3N_4$), boron nitride (BN), titanium nitride (TiN), and the like. The metal oxide hydrate, for example, is boehmite ($Al_2O_3H_2O$ or AlOOH), and the like. The metal hydroxide, for example, is aluminum hydroxide ($Al(OH)_3$) and the like. The metal carbide, for example, is silicon carbide (SiC), boron carbide ($B_4C$), and the like. The metal sulfide, for example, is barium sulfate ($BaSO_4$), and the like.

[Confirmation Method of Electrolyte Layer]

A confirmation method of the presence or absence, the configuration, and the like of the electrolyte layer 27 is as follows.

In order to confirm the presence or absence of the electrolyte layer 27, for example, a sectional surface (refer to FIG. 2) of the wound electrode body 20 observed by using a microscope after the wound electrode body 20 is cut. With this arrangement, it is possible to confirm whether the electrolyte layer 27 exists between the negative electrode 22 and the separator 23. Furthermore, for example, an optical microscope, an electronic microscope, or the like can be used as the microscope.

In order to confirm the presence or absence of the negative electrode active material contained in the electrolyte layer 27, for example, similar to the case of confirming the presence or absence of the electrolyte layer 27, the sectional surface of the wound electrode body 20 may be observed by using the microscope.

In order to confirm the composition or the like of the polymer compound and the negative electrode active material contained in the electrolyte layer 27, for example, the sectional surface of the electrolyte layer 27 may be observed and analyzed after the battery is disassembled and the electrolyte layer 27 is taken out. For example, a scanning electronic microscope-energy dispersion type X-ray spectroscopy (SEM-EDX), and the like can be used an observation method and an analysis method.

In addition, the polymer compound and the negative electrode active material may be analyzed after the configuration material of the electrolyte layer 27 is extracted by using an organic solvent such as N-methyl-2-pyrrolidone, and a soluble polymer compound is separated from an insoluble negative electrode active material. For example, a nuclear magnetic resonance (NMR) method, an X-ray diffraction (XRD) method, a gas chromatography method, a mass analysis method, or the like can be used as the analysis method.

Furthermore, the conductive assistant and the insulating material contained in the conductive layer 27 can also be confirmed by a method similar to the method described above of confirming the presence or absence, the composition, and the like of the polymer compound and the negative electrode active material.

[Battery Voltage]

In the non-aqueous electrolyte battery, an open circuit voltage (that is, a battery voltage) per a pair of the positive electrode 21 and the negative electrode 22 at the time of full charge, for example, may be set to be in a range of greater than or equal to 2.80 V and less than or equal to 6.00 V or greater than or equal to 3.60 V less than or equal to 6.00 V, preferably in a range of greater than or equal to 4.25 V and less than or equal to 6.00 V or greater than or equal to 4.20 V and less than or equal to 4.50 V, and more preferably in a range of greater than or equal to 4.30 V and less than or equal to 4.55 V. In addition, the open circuit voltage per a pair of the positive electrode 21 and the negative electrode 22 at the time of full charge may be set to be preferably in a range or greater than or equal to 4.35 V, more preferably in a range or greater than or equal to 4.35 V and less than or equal to 6.00 V, and further more preferably in a range or greater than or equal to 4.4 V and less than or equal to 5.0 V. In a case where the open circuit voltage at the time of full charge, for example, is greater than or equal to 4.25 V in the battery using a layered rock salt type lithium composite oxide or the like as the positive electrode active material, and even in the case of the same positive electrode active material, a discharge amount of lithium per unit mass increases compared to a battery of 4.20 V, and thus, the amount of the positive electrode active material and the negative electrode active material is adjusted according to this, and a high energy density is obtained.

[Operation of Battery]

In the battery having the configuration described above, in a case where the battery is charged, for example, a lithium ion is discharged from the positive electrode active material layer 21B, and is absorbed in the negative electrode active material layer 22B through the electrolytic solution impregnated into the separator 23 and the electrolyte layer 27. In addition, in a case where the battery is discharged, for example, the lithium ion is discharged from the negative electrode active material layer 22B, and is absorbed in the positive electrode active material layer 21B through the electrolyte layer 27 and the electrolytic solution impregnated into the separator 23.

[Manufacturing Method of Battery]

Next, an example of a manufacturing method of the battery according to the first embodiment of the present technology will be described.

The positive electrode will be prepared as follows. First, for example, a positive electrode active material, a conductive agent, and a binder are mixed, and thus, a positive electrode mixture is prepared, and the positive electrode mixture is dispersed in a solvent such as N-methyl-2-pyrrolidone (NMP), and thus, a paste-like positive electrode mixture slurry is prepared. Next, the positive electrode mixture slurry is applied onto the positive electrode collector 21A, the solvent is dried, and compression molding is performed by a roll press machine or the like, and thus, the positive electrode active material layer 21B is formed, and the positive electrode 21 is formed.

The negative electrode will be prepared as follows. First, for example, a negative electrode active material and a binder are mixed, and thus, a negative electrode mixture is prepared, and the negative electrode mixture is dispersed in a solvent such as N-methyl-2-pyrrolidone, and thus, a paste-like negative electrode mixture slurry is prepared. Next, The negative electrode mixture slurry is applied onto the negative electrode collector 22A, the solvent is dried, and compression molding is performed by using a roll press machine or the like, and thus, the negative electrode active material layer 22B is formed, and the negative electrode 22 is prepared.

The electrolyte layer 27 will be formed as follows. First, a solvent such as an organic solvent, a polymer compound, a negative electrode active material, and one or both of a conductive assistant and an insulating material, as necessary, are mixed, and thus, an electrolyte solution is prepared. In the electrolyte solution, the polymer compound is dissolved by the solvent, and the negative electrode active material is dispersed in the solvent where the polymer compound is dissolved. Next, the electrolyte solution is applied onto both surfaces of the negative electrode 22, and then, the electrolyte solution is dried. Furthermore, the negative electrode 22 may be immersed in the electrolyte solution instead of applying the electrolyte solution onto the negative electrode 22, and then, the negative electrode 22 may be dried.

Here, the electrolyte layer 27 will be formed as follows. That is, the electrolyte solution may be applied onto one surface of both surfaces of the separator 23, facing the negative electrode 22, instead of applying the electrolyte solution onto both surfaces of the negative electrode 22, and thus, the electrolyte layer 27 may be formed. This is because even in the case of using any forming method described above, the electrolyte layer 27 is finally disposed between the negative electrode 22 and the separator 23.

Next, the positive electrode lead 25 is attached to the positive electrode collector 21A by welding or the like, and the negative electrode lead 26 is attached to the negative electrode collector 22A by welding or the like. Next, the positive electrode 21 and the negative electrode 22 are wound through the separator 23. Next, a tip end portion of the positive electrode lead 25 is welded to the safety valve mechanism 15, a tip end portion of the negative electrode lead 26 is welded to the battery can 11, and the wound positive electrode 21 and negative electrode 22 are interposed between the pair of insulating plates 12 and 13, and are stored in the battery can 11. Next, the positive electrode 21 and the negative electrode 22 are stored in the battery can 11, and then, the electrolytic solution is injected into the battery can 11, and is impregnated into the separator 23. Next, the battery lid 14, the safety valve mechanism 15, and the positive temperature coefficient element 16 are fixed to an opening end portion of the battery can 11 by being tightened through the sealing gasket 17. With this arrangement, the battery illustrated in FIG. 1 is obtained.

[Effect]

In the battery according to the first embodiment, the electrolyte layer 27 is provided between the negative electrode 22 and the separator 23. With this arrangement, lithium is precipitated on a front surface of the negative electrode 22 at the time of charge, and the lithium is easily dissolved again at the time of discharge, and thus, the precipitation of lithium is suppressed. Therefore, it is possible to improve the cycle characteristics compared to a case where the electrolyte layer 27 is not provided between the negative electrode 22 and the separator 23.

In a case where the battery is used in a low temperature environment, in particular, a considerable effect is obtained. In the battery where the electrolyte layer 27 is not provided between the negative electrode 22 and the separator 23, lithium tends to be particularly easily precipitated on the front surface of the negative electrode 22 at a low temperature. In contrast, in the battery where the electrolyte layer 27 is provided between the negative electrode 22 and the separator 23, the precipitation of lithium is suppressed even at a low temperature.

The electrolyte layer 27 is provided as described above, and thus, it is possible to allow an electrolyte containing a negative electrode active material in a void such as a fine pore of the negative electrode active material layer 22B. For this reason, even in a case where the negative electrode active material layer 22B is subjected to expansion and contraction at the time of charge and discharge, an electronic conduction path between the negative electrode active materials contained in the negative electrode active material layer 22B is ensured by the negative electrode active material existing in the void, and thus, it is difficult for the negative electrode active material to be isolated. In addition, the electrolyte layer 27 is provided as described above, and thus, it is possible to form a stable electrode-electrolyte interface. With this arrangement, even in a case where charge and discharge are repeated, a decrease in the electric conductivity of the negative electrode active material layer 22B is suppressed, and thus, excellent cycle characteristics are obtained.

Furthermore, in a case where the electrolyte layer 27 contains a conductive assistant, the conductive assistant also contributes to the ensuring of the electronic conduction path.

Modification Example

Modification Example 1

Figure 3:
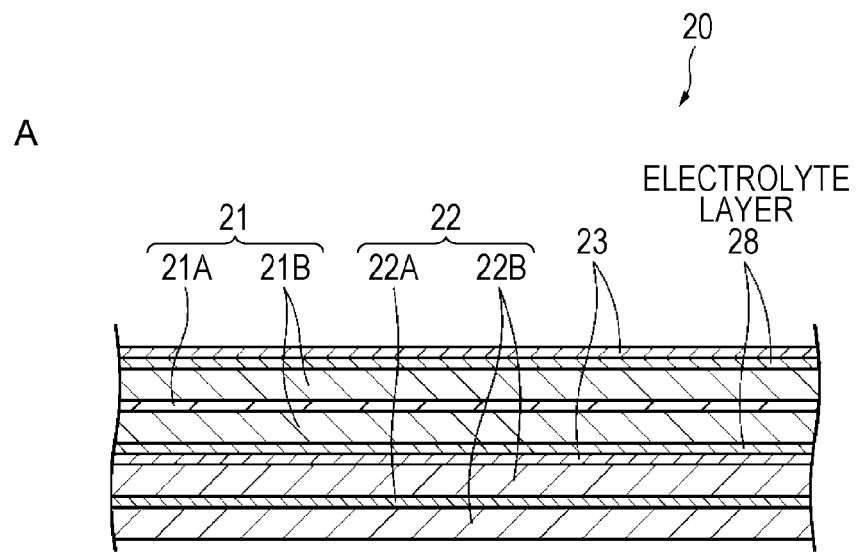
FIG. 3A is a sectional view illustrating a configuration example of a non-aqueous electrolyte secondary battery according to Modification Example 1 of the first embodiment of the present technology.
FIG. 3B is a sectional view illustrating a configuration example of a non-aqueous electrolyte secondary battery according to Modification Example 2 of the first embodiment of the present technology.
Figure 3:
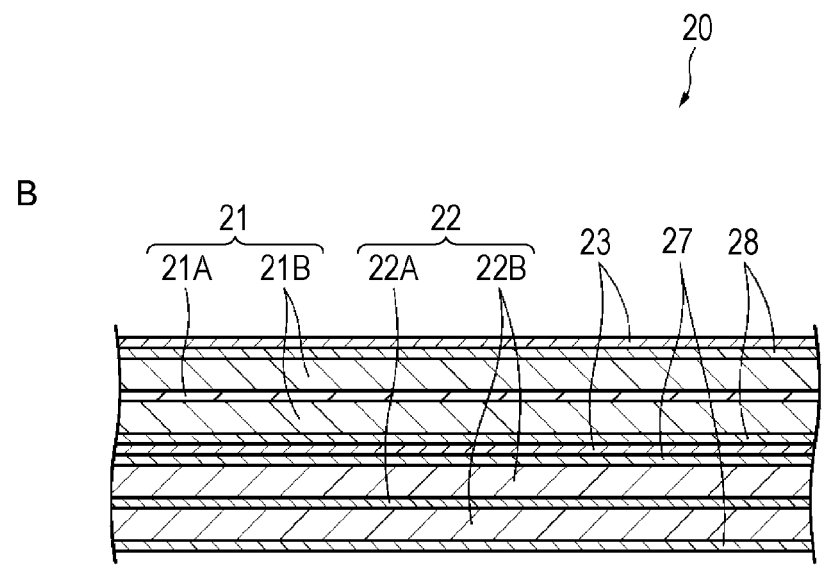

As illustrated in FIG. 3A, the electrolyte layer 27 may not be disposed between the negative electrode 22 and the separator 23, but an electrolyte layer 28 may be disposed between the positive electrode 21 and the separator 23. In this case, the electrolyte layer 28 is disposed to be adjacent to the positive electrode 21, and is disposed by being separated from the negative electrode 22 through the separator 23.

It is preferable that an electrolyte configuring the electrolyte layer 28 exists in a void such as a fine pore of the positive electrode active material layer 21B. This is because it is difficult for the positive electrode active material to be isolated, and more excellent cycle characteristics are obtained.

In a case where the negative electrode active material is inhomogeneously distributed in a thickness direction of the electrolyte layer 28, it is preferable that a concentration distribution of the negative electrode active material is maximized in the interface on the positive electrode 21 side or in the vicinity thereof, and decreases as being separated from the positive electrode 21 side. This is because it is possible to further improve electric conductivity of the positive electrode active material layer 21B.

The electrolyte layer 28, for example, is formed on both surfaces of the positive electrode 21 or a surface of the separator 23 facing the positive electrode 21. Specifically, for example, the electrolyte layer 28 is obtained by applying a solution for forming an electrolyte layer or a solution for forming a polymer layer onto both surfaces of the positive electrode 21, or the surface of the separator 23 facing the positive electrode 21.

The configuration of the electrolyte layer 28 other than above description is similar to that of the electrolyte layer 27.

In a battery according to Modification Example 1 of first embodiment, the electrolyte layer 28 is provided between the positive electrode 21 and the separator 23. With this arrangement, it is possible to allow the electrolyte containing the negative electrode active material in the void such as the fine pore of the positive electrode active material layer 22B. For this reason, even in a case where the negative electrode active material layer 22B is subjected to expansion and contraction at the time of charge and discharge, an electronic conduction path between the positive electrode active materials contained in the positive electrode active material layer 21B is ensured by the negative electrode active material existing in the void, and thus, it is difficult for the positive electrode active material to be isolated. In addition, the negative electrode active material having electric conductivity is higher than that of the positive electrode active material exists between the positive electrode active materials of which electronic conductivity generally decreases, and thus, an excellent electronic conduction path is formed. Therefore, even in a case where charge and discharge are repeated, a decrease in the electric conductivity of the positive electrode active material layer 21B is suppressed, and thus, excellent cycle characteristics are obtained. Furthermore, even in a case where the electrolyte layer 28 contains a conductive assistant, the conductive assistant also contributes to the ensuring of the electronic conduction path.

Modification Example 2

As illustrated in FIG. 3B, the electrolyte layer 27 may be disposed between the negative electrode 22 and the separator 23, and the electrolyte layer 28 may be disposed between the positive electrode 21 and the separator 23. In this case, the electrolyte layer 27 is disposed to be adjacent to the negative electrode 21, and the electrolyte layer 28 is disposed to be adjacent to the positive electrode 22.

The configurations (for example, the materials, the thicknesses, and the like) of the electrolyte layers 27 and 28 may be the same, or the configurations of the electrolyte layers 27 and 28 may be different from each other. For example, the compositions of the negative electrode active materials contained in the electrolyte layers 27 and 28 may be the same, or may be different from each other. It is preferable that the negative electrode active materials contained in the electrolyte layers 27 and 28 area metal oxide. This is because it is possible to suppress short-circuit between the positive electrode 21 and the negative electrode 22. For example, it is preferable that lithium titanate is used as the metal oxide.

Both of the electrolyte layers 27 and 28 may contain an insulating material, or only one of the electrolyte layers 27 and 28 may contain the insulating material. Similarly, both of the electrolyte layers 27 and 28 may contain a conductive assistant, or only one of the electrolyte layers 27 and 28 may contain the conductive assistant.

In a battery according to Modification Example 2 of the first embodiment, it is possible to obtain a function effect similar to that of the battery according to the first embodiment and Modification Example 1.

Furthermore, in a case where any one of the electrolyte layer 28 and the electrolyte layer 27 is disposed, it is preferable that the electrolyte layer 27 is disposed. This is because in a case where the electrolyte layer 27 is disposed, an effect capable of suppressing the precipitation of lithium on a front surface of the negative electrode 21 is also obtained in addition to an effect of suppressing a decrease in electric conductivity of an active material layer.

Modification Example 3

An electrolyte layer containing a conductive assistant may be used instead of the negative electrode active material. In this case, the same effect as that of the case of using the electrolyte layer containing the negative electrode active material, that is, an effect capable of improving the cycle characteristics can be obtained. Here, in a battery using the electrolyte layer containing the negative electrode active material, a more excellent effect can be obtained, compared to the battery using the electrolyte layer containing the conductive assistant.

2. Second Embodiment

[Configuration of Battery]

Here, a configuration example of a battery according to a second embodiment of the present technology will be described with reference to FIG. 4. The battery is referred to as a so-called laminated film type battery, and has a flat or an angular shape. The battery contains a wound electrode body 30 to which a positive electrode lead 31 and a negative electrode lead 32 are attached in film-like exterior members 40, and is capable of reducing the size, the weight, and the thickness.

The positive electrode lead 31 and the negative electrode lead 32 are respectively derived, for example, in the same direction toward the outside from the inside of the exterior member 40. The positive electrode lead 31 and the negative electrode lead 32, for example, are respectively configured of a metal material such as aluminum, copper, nickel, or stainless, and are respectively in the shape of a thin plate or a reticulation.

The exterior member 40, for example, is configured of a rectangular aluminum laminated film in which a nylon film, an aluminum foil, and a polyethylene film are bonded together in this order. The exterior members 40, for example, are disposed such that the polyethylene film side faces the wound electrode body 30, and outer edge portions of the exterior members 40 are respectively subjected to cohesion by fusion or an adhesive agent. A cohesive film 41 for protecting the entering of the outside air is inserted between the exterior member 40, and the positive electrode lead 31 and negative electrode lead 32. The cohesive film 41 is configured of a material having cohesiveness with respect to the positive electrode lead 31 and the negative electrode lead 32, for example, a polyolefin resin such as polyethylene, polypropylene, denatured polyethylene, or denatured polypropylene.

Furthermore, the exterior member 40 may be configured of a laminated film, a polymer film such as polypropylene, or a metal film, having other structures, instead of the aluminum laminated film described above. Alternatively, a laminated film in which a polymer film is laminated on one surface or both surfaces may be used as a core material of an aluminum film.

Figure 4:
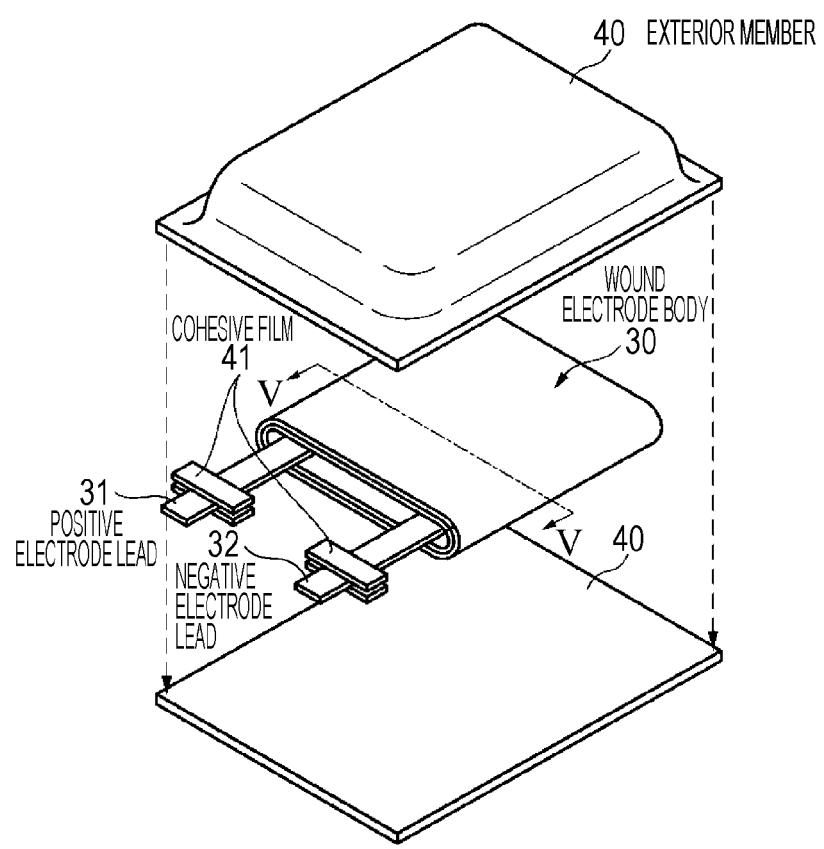
FIG. 4 is an exploded perspective view illustrating a configuration example of a non-aqueous electrolyte secondary battery according to a second embodiment of the present technology.
Figure 5:
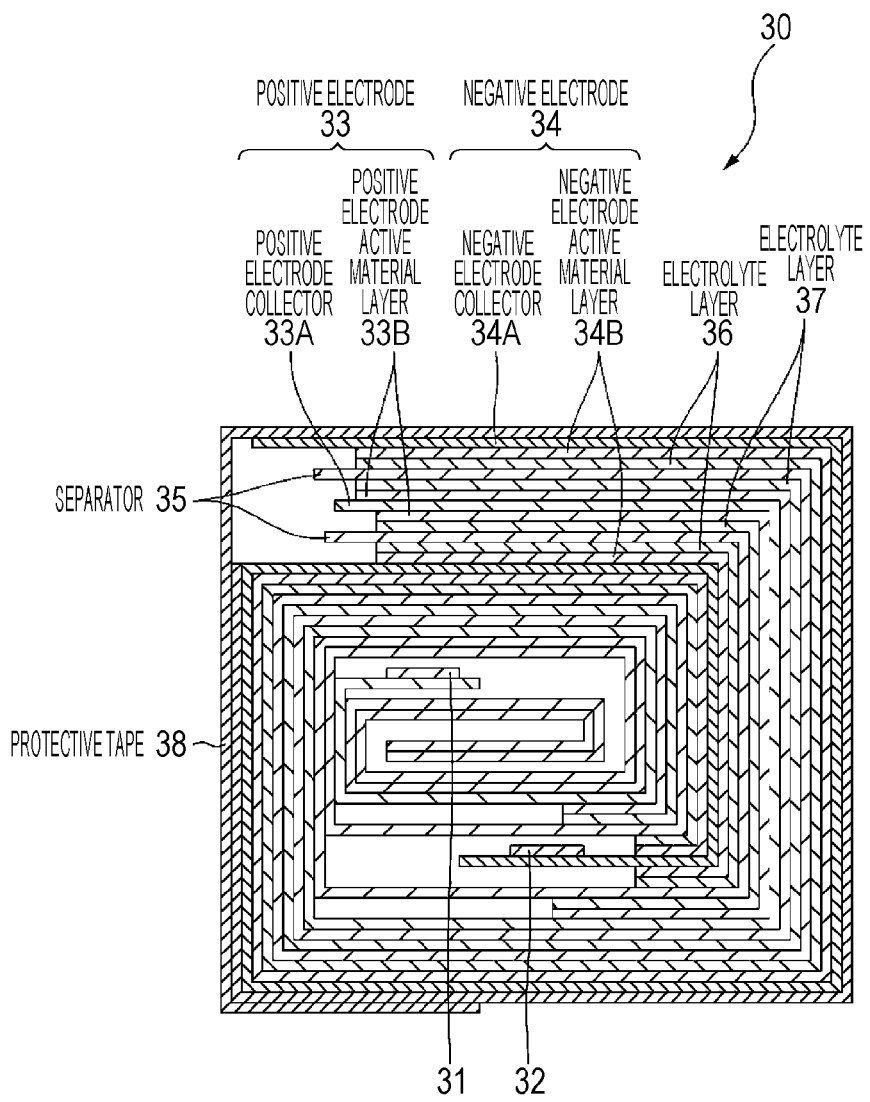
FIG. 5 is a sectional view of a wound electrode body along line V-V of FIG. 4.

FIG. 5 is a sectional view taken along line V-V of the wound electrode body 30 illustrated in FIG. 4. In the wound electrode body 30, the positive electrode 33 and the negative electrode 34 are laminated and wound through a separator 35 and electrolyte layers 36 and 37, and the outermost circumferential portion is protected by a protective tape 38. The electrolyte layer 36 is disposed between the negative electrode 34 and the separator 35, and the electrolyte layer 37 is disposed between the positive electrode 33 and the separator 35.

(Positive Electrode, Negative Electrode, and Separator)

The positive electrode 33 has a structure in which a positive electrode active material layer 33B is disposed on one surface or both surfaces of a positive electrode collector 33A. The negative electrode 34 has a structure in which a negative electrode active material layer 34B is disposed on one surface or both surfaces of a negative electrode collector 34A, and the negative electrode active material layer 34B and the positive electrode active material layer 33B are arranged to face each other. The configurations of the positive electrode collector 33A, the positive electrode active material layer 33B, the negative electrode collector 34A, the negative electrode active material layer 34B, and the separator 35 are respectively similar to those of the positive electrode collector 21A, the positive electrode active material layer 21B, the negative electrode collector 22A, the negative electrode active material layer 22B, and the separator 23 of the second embodiment.

(Electrolyte Layer)

The electrolyte layer 36 is the electrolyte layer 27 according to the first embodiment. The electrolyte layer 37 is the electrolyte layer 28 according to Modification Example 1 of the first embodiment. It is preferable that the electrolyte layers 36 and 37 are a so-called gel electrolyte layer. This is because the gel electrolyte layer is capable of obtaining a high ion conductance rate, and is capable of protecting a liquid leakage of a battery.

[Manufacturing Method of Battery]

Next, an example of a manufacturing method of a non-aqueous electrolyte secondary battery according to a third embodiment of the present technology will be described.

First, a precursor solution containing a solvent, an electrolytic salt, a negative electrode active material, a polymer compound, and a mixed solvent is applied onto each of the positive electrode 33 and the negative electrode 34, and the mixed solvent is volatilized, and thus, the electrolyte layers 36 and 37 are formed. Next, the positive electrode lead 31 is attached to an end portion of the positive electrode collector 33A by welding, and the negative electrode lead 32 is attached to an end portion of the negative electrode collector 34A by welding. Next, the positive electrode 33 and the negative electrode 34 on which the electrolyte layer 36 is formed are laminated through the separator 35, and thus, a laminate is obtained, and then, the laminate is wound in a longitudinal direction thereof, the protective tape 38 adheres to the outermost circumferential portion thereof, and the wound electrode body 30 is formed. Finally, for example, the wound electrode body 30 is interposed between the exterior members 40, and the outer edge portions of the exterior members 40 are subjected to cohesion by thermal fusion or the like, and are sealed. At this time, the cohesive film 41 is inserted between the positive electrode lead 31 and the negative electrode lead 32, and the exterior member 40. With this arrangement, a secondary battery illustrated in FIG. 4 and FIG. 4 is obtained.

In addition, the secondary battery may be prepared as follows. First, the positive electrode 33 and the negative electrode 34 are prepared as described above, and the positive electrode lead 31 and the negative electrode lead 32 are attached to the positive electrode 33 and the negative electrode 34. Next, the positive electrode 33 and the negative electrode 34 are laminated and wound through the separator 35, and the protective tape 38 adheres to the outermost circumferential portion thereof, and thus, a wound body is formed. Next, the wound body is interposed between the exterior members 40, and an outer circumferential edge portion excluding one side is subjected to thermal fusion, is formed into the shape of a pouch, and is stored in the exterior members 40. Next, a composition for an electrolyte containing a solvent, an electrolytic salt, a negative electrode active material, a monomer, which is a raw material of a polymer compound, a polymerization initiator, and other materials such as a polymerization inhibitor, as necessary, is prepared, and is injected into the exterior members 40.

Next, the composition for an electrolyte is injected into the exterior members 40, and then, opening portions of the exterior members 40 are subjected to thermal fusion under a vacuum atmosphere, and are sealed. Next, the monomer is polymerized by being heated, and a polymer compound is obtained, and thus, the electrolyte layers 36 and 37 are formed. As described above, the secondary battery illustrated in FIG. 4 is obtained.

[Effect]

In the battery according to the second embodiment, the electrolyte layer 36 is provided between the negative electrode 34 and the separator 35, and the electrolyte layer 37 is provided between the positive electrode 33 and the separator 35. With this arrangement, an effect similar to that of the battery according to Modification Example 2 of the first embodiment can be obtained. In addition, in the battery according to the second embodiment of the present technology, the laminated film is used as the exterior member 40, and thus, an effect capable of suppressing the swell of the battery due to a by-product or the like according to charge and discharge is obtained.

Modification Example

Modification Example 1

Only one of the electrolyte layers 36 and 37 may contain a negative electrode active material, and the other may not contain the negative electrode active material. In this case, it is preferable that the electrolyte layer 36 contains the negative electrode active material from the viewpoint of improving the cycle characteristics.

Modification Example 2

Only one of the electrolyte layers 36 and 37 may be disposed. In this case, in a previous step of sealing the exterior member 40, it is preferable that an electrolytic solution is injected into the exterior members 40, and the electrolytic solution is impregnated into the wound electrode body 30.

3. Third Embodiment

In a third embodiment, a battery pack and an electronic device, including the battery according to the first embodiment or the second embodiment, will be described. Here, the battery pack and the electronic device may include the battery according to the modification examples of the first embodiment or the second embodiment.

[Configuration of Battery Pack and Electronic Device]

Figure 6:
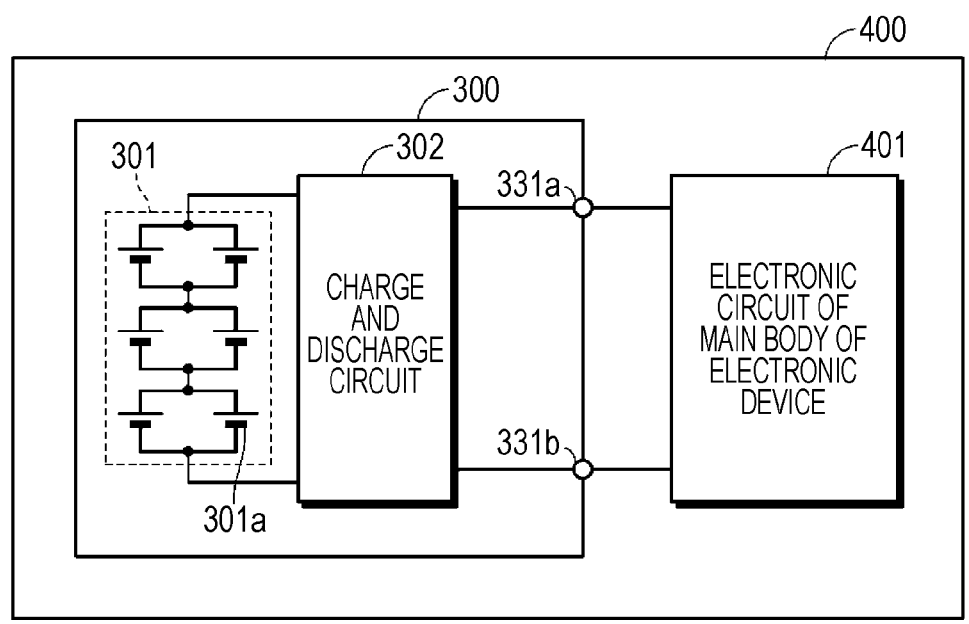
FIG. 6 is a block diagram illustrating a configuration example of a battery pack and an electronic device according to a third embodiment of the present technology.

Hereinafter, with reference to FIG. 6, a configuration example of a battery pack 300 and an electronic device 400 according to a third embodiment of the present technology will be described. The electronic device 400 includes an electronic circuit 401 of the main body of the electronic device, and the battery pack 300. The battery pack 300 is electrically connected to the electronic circuit 401 through a positive electrode terminal 331a and a negative electrode terminal 331b. The electronic device 400, for example, has a configuration in which the battery pack 300 can be detached by a user. Furthermore, the configuration of the electronic device 400 is not limited thereto, and may have a configuration in which the battery pack 300 is embedded in the electronic device 400 such that the battery pack 300 is not capable of being detached from the electronic device 400 by the user.

When the battery pack 300 is charged, each of the positive electrode terminal 331a and the negative electrode terminal 331b of the battery pack 300 is connected to a positive electrode terminal and a negative electrode terminal of a charger (not illustrated). On the other hand, when the battery pack 300 is discharged (when the electronic device 400 is used), each of the positive electrode terminal 331a and the negative electrode terminal 331b of the battery pack 300 is connected to a positive electrode terminal and a negative electrode terminal of the electronic circuit 401.

Examples of the electronic device 400 include a note type personal computer, a tablet type computer, a mobile phone (for example, a smart phone and the like), personal digital assistants (PDA), a display device (an LCD, an EL display, electronic paper, and the like), an imaging device (for example, a digital still camera, a digital video camera, and the like), an audio device (for example, a portable audio player), a game device, a cordless intercommunication slave unit, an electronic book, an electronic dictionary, a radio, a headphone, a navigation system, a memory card, a pace maker, an acoustic aid, an electric tool, an electric shaver, a refrigerator, an air conditioner, a television, a stereo, a water heater, a microwave oven, a dish washing machine, a washing machine, a dryer, an illumination device, a toy, a medical device, a robot, a road conditioner, a signal light, and the like, but are not limited thereto.

(Electronic Circuit)

The electronic circuit 401, for example, includes a CPU, a peripheral logic unit, an interface portion, a storage unit, and the like, and controls the entire electronic device 400.

(Battery Pack)

The battery pack 300 includes an assembled battery 301 and a charge and discharge circuit 302. The assembled battery 301 is configured by connecting a plurality of secondary batteries 301a in series and/or in parallel. The plurality of secondary batteries 301a, for example, are connected in n parallel and m series (n and m are positive integer numbers). Furthermore, in FIG. 6, an example is illustrated in which six secondary batteries 301a are connected in two parallel and three series (2P3S). The battery according to the first embodiment or the second embodiment is used as the secondary battery 301a.

The charge and discharge circuit 302 is a control unit controlling the charge and discharge of the assembled battery 301. Specifically, the charge and discharge circuit 302 controls the charge with respect to the assembled battery 301 at the time of charge. On the other hand, the charge and discharge circuit 302 controls the discharge with respect to the electronic device 400 at the time of discharge (that is, at the time of using the electronic device 400).

Modification Example

In the third embodiment described above, a case where the battery pack 300 includes the assembled battery 301 configured of the plurality of secondary batteries 301a has been described as an example, and the battery pack 300 may adopt a configuration in which one secondary battery 301a is provided instead of the assembled battery 301.

4. Fourth Embodiment

In a fourth embodiment, an electric storage system including the battery according to the first embodiment or the second embodiment in an electric storage device will be described. The electric storage system may be any electric storage system insofar as the electric storage system uses power, and also includes a simple power device. The power system, for example, includes a smart grid, a domestic energy management system (HEMS), a vehicle, and the like, and is also capable of performing electric storage. Here, the electric storage device may include the battery of the modification examples of the first embodiment or the second embodiment.

[Configuration of Electric Storage System]

Figure 7:
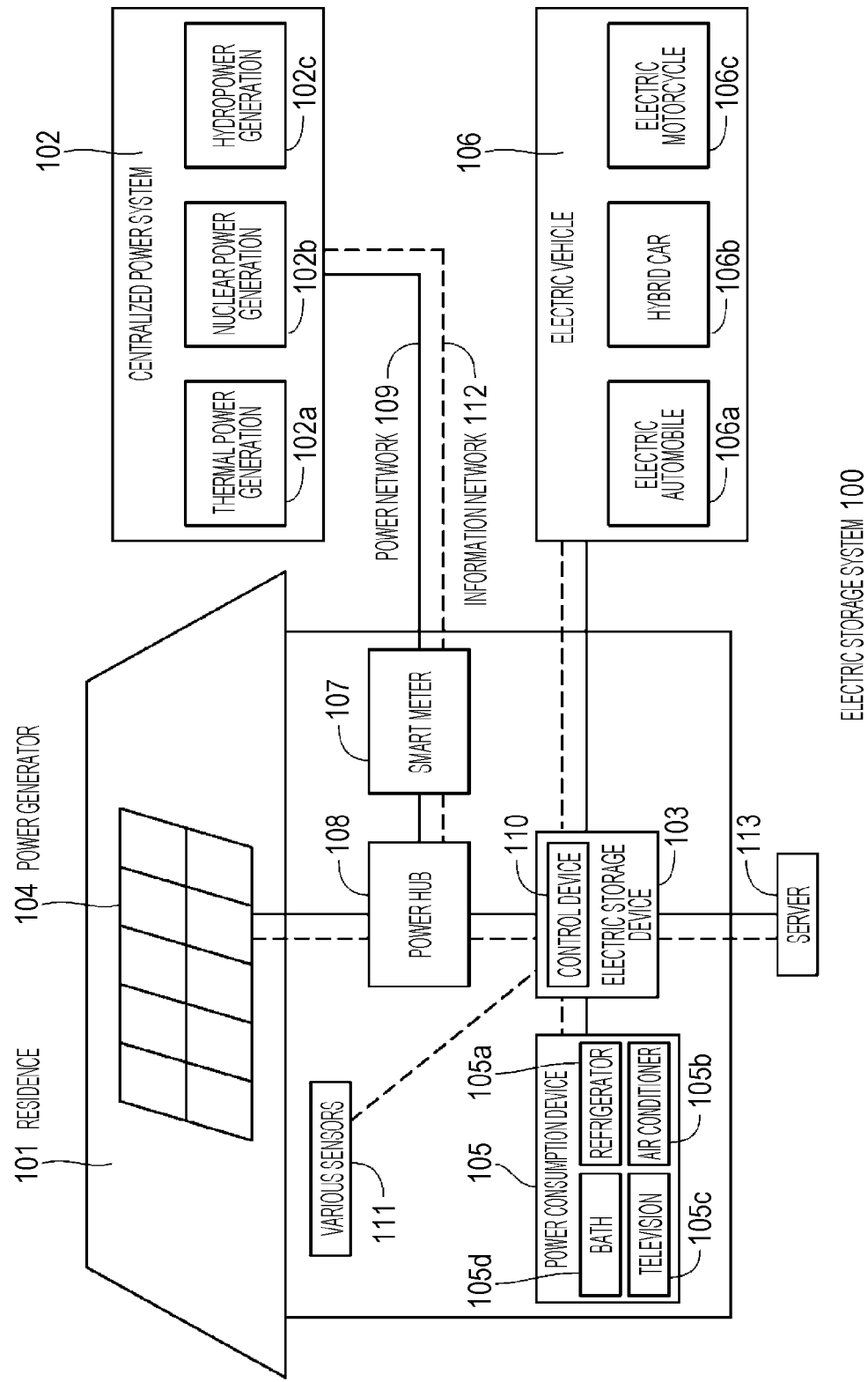
FIG. 7 is a schematic view illustrating a configuration example of an electric storage system according to a fourth embodiment of the present technology.

Hereinafter, a configuration example of an electric storage system (a power system) 100 according to a fourth embodiment will be described with reference to FIG. 7. The electric storage system 100 is a residential electric storage system, and power supplied to an electric storage device 103 from a centralized power system 102 such as thermal power generation 102a, nuclear power generation 102b, and hydropower generation 102c through a power network 109, an information network 112, a smart meter 107, a power hub 108, and the like. In addition, power is supplied to the electric storage device 103 from an independent power source such as a domestic power generator 104. The power supplied to the electric storage device 103 is subjected to electric storage. Power to be used in a residence 101 is supplied by using the electric storage device 103. A similar electric storage system can be used not only in the residence 101 but also in a building.

In the residence 101, the domestic power generator 104, a power consumption device 105, the electric storage device 103, a control device 110 controlling each device, a smart meter 107, a power hub 108, and a sensor 111 acquiring various information items are disposed. Each of the devices is connected by the power network 109 and the information network 112. A solar battery, a fuel battery, and the like are used as the domestic power generator 104, the generated power is supplied to the power consumption device 105 and/or the electric storage device 103. The power consumption device 105 is a refrigerator 105a, an air conditioning device 105b, a television receiver 105c, a bath 105d, and the like. Further, the power consumption device 105 includes an electric vehicle 106. The electric vehicle 106 is an electric automobile 106a, a hybrid car 106b, an electric motorcycle 106c, and the like.

The electric storage device 103 includes the battery according to the first embodiment or the second embodiment. The smart meter 107 has a function of measuring a use amount of commercial power, and of transmitting the measured use amount to the power company. The power network 109 may be one or a plurality of combinations of direct current power supply, alternate current power supply, and non-contact power supply.

Various sensors 111, for example, area human sensor, an illuminance sensor, an object detection sensor, a power consumption sensor, a vibration sensor, a contact sensor, a temperature sensor, an infrared sensor, and the like. Information acquired by various sensors 111 is transmitted to the control device 110. The state of the weather, the state of a person, and the like are grasped, and the power consumption device 105 is automatically controlled, according to the information from the sensor 111, and thus, the energy consumption can be minimized. Further, the control device 110 is capable of transmitting information relevant to residence 101 to the external power company or the like through the internet.

Processing such as the branching of a power line and direct current/alternate current conversion is performed by the power hub 108. A communication method of the information network 112 to be connected to the control device 110 is a method using a communication interface such as a universal asynchronous receiver-transceiver (UART: a transmission and reception circuit for asynchronous serial communication), and a method using a sensor network according to the wireless communication standard such as Bluetooth (Registered Trademark), ZigBee, and Wi-Fi. A Bluetooth (Registered Trademark) method is applied to multimedia communication, and it is possible to perform point to multipoint communication. In ZigBee, a physical layer of institute of electrical and electronics engineers (IEEE) 802.15.4 is used. IEEE 802.15.4 is the name of the short-distance wireless network standard referred to as a personal area network (PAN) or a wireless (W) PAN.

The control device 110 is connected to an external server 113. The server 113 may be managed by any one of the residence 101, the power company, and the service provider. The information which is transmitted and received by the server 113, for example, is power consumption information, life pattern information, a power rate, weather information, disaster information, and information relevant to power transaction. Such information items may be transmitted and received from a domestic power consumption device (for example, a television receiver), and may be transmitted and received from an outside device (for example, a mobile phone or the like). Such information items may be displayed on a device having a display function, for example, a television receiver, a mobile phone, personal digital assistants (PDA), and the like.

The control device 110 controlling each unit is configured of a central processing unit (CPU), a random access memory (RAM), a read only memory (ROM), and the like, and in this example, is contained in the electric storage device 103. The control device 110 is connected to the electric storage device 103, the domestic power generator 104, the power consumption device 105, various sensors 111, and the server 113 through the information network 112, and for example, has a function of adjusting the use amount of the commercial power and a power generation amount. Furthermore, the control device 110 has a function of performing power transaction in the power market, or the like.

As described above, not only is power capable of being accumulated not only in the centralized power system 102 such as the thermal power generation 102a, the nuclear power generation 102b, and the hydropower generation 102c, but also the generated power of the domestic power generator 104 (solar power generation and wind power generation) is capable of being accumulated in the electric storage device 103. Therefore, even in a case where the generated power of the domestic power generator 104 varies, it is possible to perform control such that the amount of power to be transmitted to the outside becomes constant or is discharged as necessary. For example, a method can be used in which power obtained by the solar power generation is accumulated in the electric storage device 103, midnight power of which the rate is low, is accumulated in the electric storage device 103 during the night time, and power which is subjected to electric storage by the electric storage device 103 in a time zone where the rate of the power is high during the day time is discharged.

Furthermore, In this example, an example has been described in which the control device 110 is contained in the electric storage device 103, but the control device 110 may be contained in the smart meter 107, or may be independently configured. Further, in the electric storage system 100, a plurality of houses in the cluster housing may be used as a target, or a plurality of single-family housings may be used as a target.

5. Fifth Embodiment

In a fifth embodiment, an electric vehicle including the battery according to the first embodiment or the second embodiment will be described. Here, the electric vehicle may include the battery according to the modification examples of the first embodiment or the second embodiment.

[Configuration of Electric Vehicle]

Figure 8:
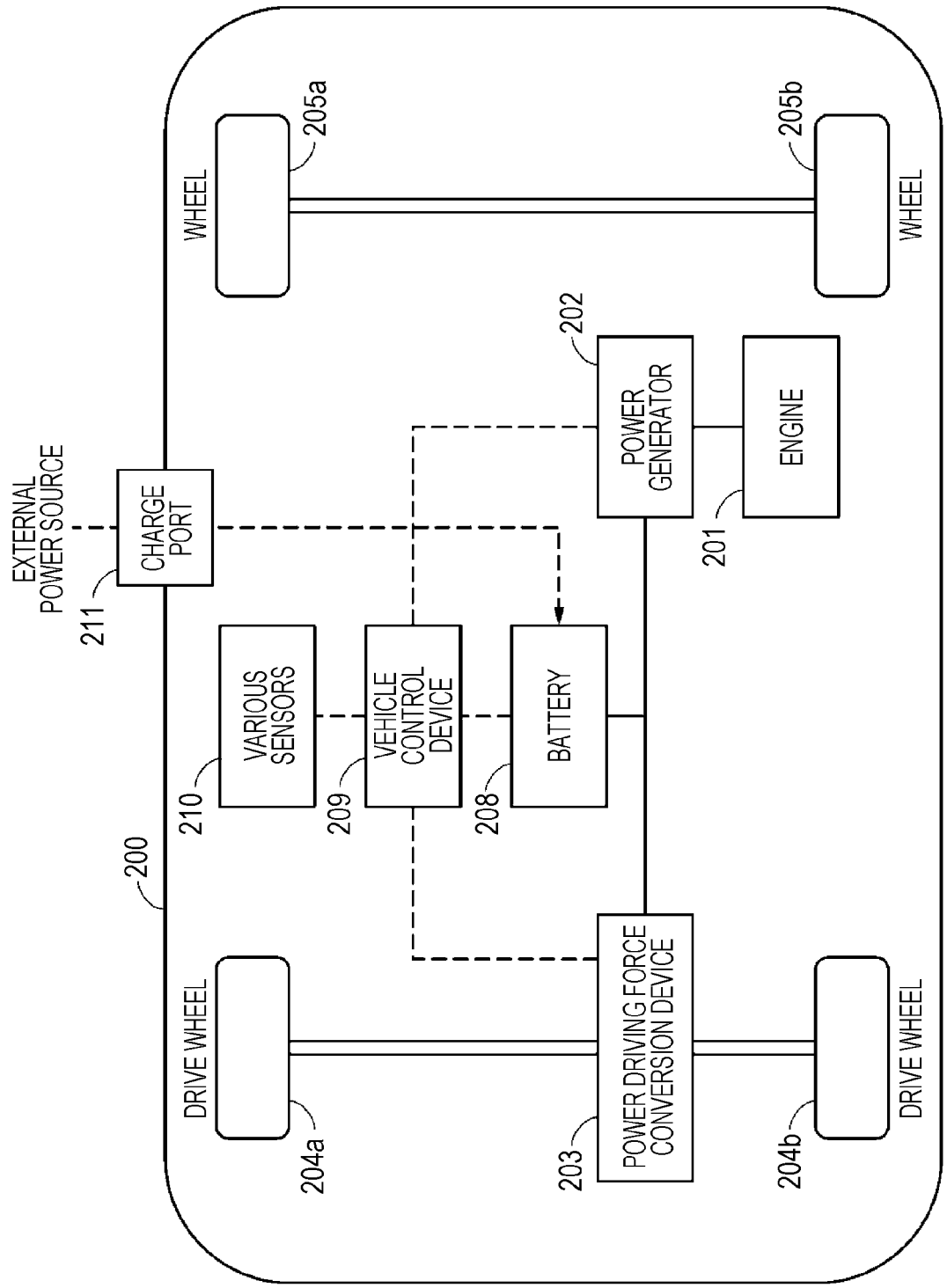
FIG. 8 is a schematic view illustrating a configuration of an electric vehicle according to a fifth embodiment of the present technology.

A configuration of an electric vehicle according to a fifth embodiment of the present technology will be described with reference to FIG. 8. A hybrid vehicle 200 is a hybrid vehicle adopting a series hybrid system. The series hybrid system is a car traveling with a power driving force conversion device 203, by using power generated from a power generator driven by an engine or power which is once stored in the battery.

An engine 201, a power generator 202, a power driving force conversion device 203, a drive wheel 204a, a drive wheel 204b, a wheel 205a, a wheel 205b, a battery 208, a vehicle control device 209, various sensors 210, and a charge port 211 are mounted on the hybrid vehicle 200. The battery according to the first embodiment or the second embodiment is used as the battery 208.

The hybrid vehicle 200 travels by using the power driving force conversion device 203 as a power source. An example of the power driving force conversion device 203 is a motor.

The power driving force conversion device 203 is operated by the power of the battery 208, and a rotative force of the power driving force conversion device 203 is transmitted to the drive wheels 204a and 204b. Furthermore, the power driving force conversion device 203 is capable of being applied to an alternate current motor or a direct current motor by using direct current-alternate current (DC-AC) or reverse conversion (AC-DC conversion) in a necessary portion. Various sensors 210 control an engine rotation speed through the vehicle control device 209, or control an aperture (a throttle aperture) of a throttle valve (not illustrated). Various sensors 210 include a velocity sensor, an acceleration sensor, an engine rotation speed sensor, and the like.

A rotative force of the engine 201 is transmitted to the power generator 202, and the power generated from the power generator 202 can be accumulated in the battery 208 by the rotative force.

In a case where the hybrid vehicle 200 is decelerated by a braking mechanism (not illustrated), a resistance force at the time the deceleration is added to the power driving force conversion device 203 as a rotative force, and regenerated power generated from the power driving force conversion device 203 is accumulated in the battery 208 by the rotative force.

The battery 208 is connected to an external power source of the hybrid vehicle 200 through the charge port 211, and thus, the supplied power can be received from the external power source by using the charge port 211 as an input port, and the received power can also be accumulated.

Even though it is not illustrated, an information processing device performing information processing relevant to vehicle control on the basis of information relevant to a non-aqueous electrolyte secondary battery may be provided. Examples of the information processing device include an information processing device or the like displaying a remaining battery level on the basis of information relevant to a remaining level of the non-aqueous electrolyte secondary battery.

Furthermore, in the above description, the series hybrid car traveling with the motor, by using the power generated from the power generator driven by the engine or the power which is once stored in the battery has been described as an example. However, the present technology can also be effectively applied to a parallel hybrid car in which three methods of traveling with only the engine, of traveling with only the motor, and of traveling with the engine and the motor are suitably switched by using the output of both of the engine and the motor as a driving source. Further, the present technology can also be effectively applied to a so-called electric vehicle traveling according to driving with only a driving motor without using the engine.

EXAMPLE

Hereinafter, the present technology will be described in detail by examples, but the present technology is not limited to only those examples.

Example 1

(Preparing Step of Positive Electrode)

A positive electrode was prepared as follows. First, 96 parts by mass of a lithium cobalt composite oxide ($LiCoO_2$) as a positive electrode active material, 3 parts by mass of polyvinylidene fluoride as a positive electrode binder, and 1 part by mass of carbon black as a positive electrode conductive agent were mixed, and thus, a positive electrode mixture was obtained. A weight average molecular weight of polyvinylidene fluoride is approximately 500000, and a weight average molecular weight similar thereto applies to the following description. Next, the positive electrode mixture was dispersed in N-methyl-2-pyrrolidone as an organic solvent, and thus, a paste-like positive electrode mixture slurry was obtained. Next, the positive electrode mixture slurry was applied onto both surfaces of a positive electrode collector (a strip-like aluminum foil having a thickness of 20 μm) by using a coating device, and then, the positive electrode mixture slurry was dried, and thus, a positive electrode active material layer was formed. Finally, the positive electrode active material layer was subjected to compression molding by using a roll press machine.

(Preparing Step of Negative Electrode)

A negative electrode was prepared as follows. First, 90 parts by mass of a graphite powder as a negative electrode active material and 10 parts by mass of polyvinylidene fluoride as a negative electrode binder were mixed, and thus, a negative electrode mixture was obtained. Next, the negative electrode mixture was dispersed in N-methyl-2-pyrrolidone as an organic solvent, and thus, a paste-like negative electrode mixture slurry was obtained. Next, the negative electrode mixture slurry was applied onto both surfaces of a negative electrode collector (a strip-like electrolytic copper foil having a thickness of 15 μm) by using a coating device, and then, the negative electrode mixture slurry was dried, and thus, a negative electrode active material layer was formed. Finally, the negative electrode active material layer was subjected to compression molding by using a roll press machine.

(Forming Step of Gel Electrolyte Layer on Negative Electrode Side)

A gel electrolyte layer on the negative electrode side was prepared as follows. First, ethylene carbonate (EC) and propylene carbonate (PC) were mixed at a mass ratio of EC:PC=50:50, and a mixed solvent was prepared, and then, lithium hexafluorophosphate ($LiPF_6$) was dissolved in the mixed solvent at a ratio of 1.0 mol/kg, and thus, an electrolytic solution was prepared. Next, polyvinylidene fluoride (PVDF) as a polymer compound, an artificial graphite powder as a negative electrode active material, an electrolytic solution, and dimethyl carbonate (DMC) as a dilution solvent were mixed at a mass ratio of PVDF:Artificial Graphite Powder:Electrolytic Solution:DMC=4:7:50:50, were stirred and dissolved, and thus, a precursor solution (hereinafter, referred to as an "active material-containing solution"), which is a sol electrolyte solution, was prepared.

Next, the active material-containing solution was applied onto both surfaces of the negative electrode, and then, the solution was dried, the dilution solvent was removed, and thus, the gel electrolyte layer containing the negative electrode active material was formed. Furthermore, a sectional surface of the gel electrolyte layer was observed by using an electronic microscope, and then, an aspect was observed in which an artificial graphite (the negative electrode active material) was dispersed in the gel electrolyte layer.

(Forming Step of Gel Electrolyte Layer on Positive Electrode Side)

A gel electrolyte layer on the positive electrode side was prepared as follows. That is, the gel electrolyte layer not containing the negative electrode active material was formed by a forming step similar to the forming step of the gel electrolyte layer on the negative electrode side, except that a precursor solution (hereinafter, referred to as an "active material-free solution") adjusted without being mixed with the negative electrode active material was used, and the prepared active material-free solution was applied onto both surfaces of the positive electrode instead of both surfaces of the negative electrode.

(Preparing Step of Laminated Film Type Battery)

A laminated film type battery was prepared as follows. First, an aluminum positive electrode lead was welded to the positive electrode collector, and a copper negative electrode lead was welded to the negative electrode collector. Next, the positive electrode in which the gel electrolyte layer on the positive electrode side was formed on both surfaces, and the negative electrode in which the gel electrolyte layer on the negative electrode side was formed on both surfaces were laminated through a separator (a microporous polypropylene film having a thickness of 23 μm). Next, the positive electrode, the negative electrode, and the separator were wound in a longitudinal direction, and thus, a wound electrode body was formed. After that, a protective tape was stuck to the outermost circumferential portion of the wound electrode body.

Next, exterior members were folded back to interpose the wound electrode body therebetween, and folded outer edge portions overlapped with other. At this time, a cohesive film (an acid-denatured propylene film having a thickness of 50 μm) was inserted between the positive electrode lead and the exterior member, and the cohesive film was inserted between the negative electrode lead and the exterior member. Next, the outer circumferential edge portions overlapping with each other were subjected to thermal fusion, and thus, the wound electrode body was stored in the pouch-like exterior members. An aluminum laminated film (having the total thickness of 100 μm) having moisture resistance, in which a nylon film (having a thickness of 30 μm), an aluminum foil (having a thickness of 40 μm), and an unstretched polypropylene film (having a thickness of 30 μm) were laminated in this order from the outside, was used as the exterior member. As described above, a desired laminated film type battery was obtained. Furthermore, in the laminated film type battery, the amount of positive electrode active material and the amount of negative electrode active material are adjusted, and an open circuit voltage (that is, a battery voltage) is set to be 4.20 V at the time of full charge.

Example 2

A battery was obtained by a method similar to that in Example 1, except that the gel electrolyte layer on the negative electrode side was prepared by using an active material-free solution in the forming step of the gel electrolyte layer on the negative electrode side, and the gel electrolyte layer of on the positive electrode side was prepared by using an active material-containing solution in the forming step of the gel electrolyte layer on the positive electrode side.

Example 3

A battery was obtained by a method similar that in Example 1, except that a natural graphite powder was used as the negative electrode active material in the forming step of the gel electrolyte layer on the negative electrode side.

Example 4

A battery was obtained by a method similar to that in Example 1, except that a lithium titanate powder was used as the negative electrode active material in the forming step of the gel electrolyte layer on the negative electrode side.

Example 5

A battery was obtained by a method similar to that in Example 1, except that a silicon oxide (SiOx) powder was used as the negative electrode active material in the forming step of the gel electrolyte layer on the negative electrode side.

Example 6

A battery was obtained by a method similar to that in Example 1, except that a silicon alloy powder was used as the negative electrode active material in the forming step of the gel electrolyte layer on the negative electrode side.

Example 7

A battery was obtained by a method similar to that in Example 2, except that a lithium titanate powder was used as the negative electrode active material in the forming step of the gel electrolyte layer on the positive electrode side.

Example 8

A battery was obtained by a method similar to that in Example 7, except that the gel electrolyte layer on the negative electrode side was prepared by using an active material-containing solution containing a lithium titanate powder as the negative electrode active material in the forming step of the gel electrolyte layer on the negative electrode side.

Example 9

A battery was obtained by a method similar to that in Example 1, except that a silicon powder was used as the negative electrode active material in the preparing step of the negative electrode.

Example 10

A battery was obtained by a method similar to that in Example 1, except that a silicon powder and a graphite powder were used as the negative electrode active material in the preparing step of the negative electrode.

Example 11

A battery was obtained by a method similar to that in Example 1, except that a tin powder was used as the negative electrode active material in the preparing step of the negative electrode.

Example 12

(Preparing Step of Positive Electrode and Negative Electrode)

A positive electrode and a negative electrode were prepared by a method similar to that in Example 1.

(Forming Step of Polymer Layer on Negative Electrode Side)

A polymer layer on a negative electrode side was prepared as follows. First, an active material-containing solution was prepared by a method similar to that in Example 1, except that the electrolytic solution was not mixed. Next, the prepared active material-containing solution was applied onto a surface of the separator on a side facing the negative electrode, and then, the solution was dried, the dilution solvent was removed, and thus, the polymer layer containing the negative electrode active material was formed.

(Forming Step of Polymer Layer on Positive Electrode Side)

A polymer layer on a positive electrode side was prepared as follows. That is, the polymer layer not containing the negative electrode active material was formed by a forming step similar to the polymer layer on the negative electrode side, except that an active material-free solution, which was adjusted without being mixed with the negative electrode active material, was used, and the prepared active material-free solution was applied onto a surface of the separator on a side facing the positive electrode.

(Preparing Step of Laminated Film Type Battery)

A laminated film type battery was prepared as follows. First, the wound electrode body was formed by a method similar to that in Example 1, except that the positive electrode and the negative electrode were laminated through the separator obtained as described above. Next, the exterior members were folded back to interpose the wound electrode body therebetween, and then, the outer circumferential edge portions were subjected to thermal fusion except for one side, and were formed into the shape of a pouch having an opening. At this time, the cohesive film was inserted between the positive electrode lead and the exterior member, and the cohesive film was inserted between the negative electrode lead and the exterior member. Next, the electrolytic solution was injected into the exterior members through the opening, the electrolytic solution was impregnated into the wound electrode body, and the remaining side of the exterior member was subjected to thermal fusion in a reduced-pressure environment. Furthermore, in the polymer layer disposed on both surfaces of the separator, a polymer compound (PVDF) was swelled according to the injection of the electrolytic solution, and thus, the polymer layer became a gel electrolyte layer. As described above, a desired laminated film type battery was obtained.

Example 13

A battery was obtained by a method similar to that in Example 1, except that polyvinylidene fluoride (PVDF) as the polymer compound, an artificial graphite powder as the negative electrode active material, an alumina powder as the insulating material, the electrolytic solution, and dimethyl carbonate (DMC) as the dilution solvent were mixed at a mass ratio of PVDF:Artificial Graphite Powder:Alumina Powder:Electrolytic Solution:DMC=4:3.5:3.5:50:50, and were stirred and dissolved, and thus, an active material-containing solution was prepared in the forming step of the gel electrolyte layer on the negative electrode side.

Examples 14, 5, and 16

A battery was obtained by a method similar to that in Example 1, except that the amount of positive electrode active material and the amount of negative electrode active material were adjusted, and an open circuit voltage (that is, a battery voltage) was set to be 4.35 V (Example 14), 4.40 V (Example 15), and 4.45 V (Example 16) at the time of full charge.

Comparative Example 1

A battery was obtained by a method similar to that in Example 1, except that the gel electrolyte layer on the negative electrode side was formed by using the active material-free solution in the forming step of the gel active material layer on the negative electrode side.

Comparative Example 2

A battery was formed by a method similar to that in Example 9, except that the gel electrolyte layer on the negative electrode side was formed by using the active material-free solution in the forming step of the gel active material layer on the negative electrode side.

Comparative Example 3

A battery was formed by a method similar to that in Example 10, except that the gel electrolyte layer on the negative electrode side was formed by using the active material-free solution in the forming step of the gel active material layer on the negative electrode side.

Comparative Example 4

A battery was formed by a method similar to that in Example 11, except that the gel electrolyte layer on the negative electrode side was formed by using the active material-free solution in the forming step of the gel active material layer on the negative electrode side.

Comparative Example 5

A battery was formed by a method similar to that in Example 8, except that artificial graphite was used as the negative electrode active material in the forming step of the gel active material layer on the negative electrode side, and artificial graphite was used as the negative electrode active material in the forming step of the gel active material layer on the positive electrode side.

Comparative Example 6

A battery was formed by a method similar to that in Example 12, except that the polymer layer on the positive electrode side was formed by using an active material-containing solution instead of the active material-free solution in the forming step of the polymer layer on the positive electrode side. Furthermore, an active material-containing solution similar to that in the forming step of the polymer layer on the negative electrode side was used as the active material-containing solution.

Comparative Example 7

A battery was formed by a method similar to that in Example 13, except that an active material-free solution prepared without being mixed with the negative electrode active material was used in the forming step of the electrolyte layer on the negative electrode side.

Comparative Examples 8, 9, and 10

A battery was formed by a method similar to that in Comparative Example 1, except that the amount of positive electrode active material and the amount of negative electrode active material were adjusted, and an open circuit voltage (that is, a battery voltage) was set to be 4.35 V (Comparative Example 8), 4.40 V (Comparative Example 9), and 4.45 V (Comparative Example 10) at the time of full charge.

[Evaluation of Cycle Characteristics and Swelling of Battery]

Cycle characteristics of the battery obtained as described above were evaluated as follows.

First, in order to stabilize a battery state, the battery was charged and discharged on one cycle in a thermoneutral environment (23° C.). Next, the battery was charged and discharged on one cycle in a low temperature environment (0° C.), and a discharge capacitance and a battery thickness on the second cycle were measured. Next, the battery was repeatedly charged and discharged until the total number of cycles in the same environment (0° C.) reached 200 cycles, and a discharge capacitance and a battery thickness on the 200th cycle were measured. Next, Capacitance Retention Rate (%)=(Discharge Capacitance on 200th Cycle/Discharge Capacitance on Second Cycle)×100 was calculated from a measurement result of the discharge capacitance described above. In addition, from a measurement result of the thickness described above, Thickness Change (%)= ((Battery Thickness on 200th Cycle)−(Battery Thickness on Second Cycle))/(Battery Thickness Second Cycle)×100 was calculated.

Furthermore, the charge and discharge of the battery was controlled as follows, according to the open circuit voltage at the time of full charge.

<Battery Having Open Circuit Voltage of 4.2 V at Time of Full Charge (Examples 1 to 13 and Comparative Examples 1 to 7)>

In charge, the charge was performed until a voltage reached 4.2 V at a current of 1 C, and then, a current reached 0.05 C at a voltage of 4.2 V. In discharge, the discharge was performed until a voltage reached 3.0 V at a current of 1 C. "1 C" is a current value at which a battery capacitance (a theoretically capacitance) can be discharged within 1 hour, and "0.05 C" is a current value at which a battery capacitance can be discharged within 20 hours.

<Battery Having Open Circuit Voltage of 4.35 V at Time of Full Charge (Example 14 and Comparative Example 8)>

In charge, the charge was performed until a voltage reached 4.35 V at a current of 1 C, and then, a current at a voltage of 4.35 V reached 0.05 C. In discharge, the discharge was performed until a voltage at a current of 1 C reached 3.0 V.

<Battery Having Open Circuit Voltage of 4.40 V at Time of Full Charge (Example 15 and Comparative Example 9)>

In charge, the charge was performed until a voltage at a current of 1 C reached 4.40 V, and then, a current at a voltage of 4.40 V reached 0.05 C. In discharge, the discharge was performed until a voltage at a current of 1 C reached 3.0 V.

<Battery Having Open Circuit Voltage of 4.45 V at Time of Full Charge (Example 16 and Comparative Example 10)>

In charge, the charge was performed until a voltage at a current of 1 C reached 4.45 V, and then, a current at a voltage of 4.45 V reached 0.05 C. In discharge, the discharge was performed until a voltage at a current of 1 C reached 3.0 V.

Table 1 represents the configurations and the evaluation results of the batteries of Examples 1 to 16 and Comparative Examples 1 to 10.

TABLE 1

| | Negative Electrode | Gel electrolyte layer on negative electrode side | | | Gel electrolyte layer on positive electrode side | | Characteristic evaluation | | |
|---|---|---|---|---|---|---|---|---|---|
| | Type of negative electrode active material | Formation surface of electrolyte layer | Type of negative electrode active material | Type of insulating Material | Formation surface of electrolyte layer | Type of negative electrode active material | Open circuit voltage [V] | Capacitance retention rate [%] | Thickness change [%] |
| Example 1 | Artificial graphite | Negative electrode side | Artificial graphite | — | Positive electrode side | — | 4.20 | 95 | 3 |
| Example 2 | Artificial graphite | Negative electrode side | — | — | Positive electrode side | Artificial graphite | 4.20 | 88 | 5 |
| Example 3 | Artificial graphite | Negative electrode side | Natural graphite | — | Positive electrode side | — | 4.20 | 96 | 4 |
| Example 4 | Artificial graphite | Negative electrode side | Lithium titanate | — | Positive electrode side | — | 4.20 | 94 | 5 |
| Example 5 | Artificial graphite | Negative electrode side | SiO | — | Positive electrode side | — | 4.20 | 92 | 4 |
| Example 6 | Artificial graphite | Negative electrode side | Silicon alloy | — | Positive electrode side | — | 4.20 | 92 | 4 |
| Example 7 | Artificial graphite | Negative electrode side | — | — | Positive electrode side | Lithium titanate | 4.20 | 89 | 9 |
| Example 8 | Artificial graphite | Negative electrode side | Lithium titanate | — | Positive electrode side | Lithium titanate | 4.20 | 88 | 4 |
| Example 9 | Si | Negative electrode side | Artificial graphite | — | Positive electrode side | — | 4.20 | 82 | 8 |

TABLE 1-continued

| | Negative Electrode | Gel electrolyte layer on negative electrode side | | | Gel electrolyte layer on positive electrode side | | Characteristic evaluation | | |
|---|---|---|---|---|---|---|---|---|---|
| | Type of negative electrode active material | Formation surface of electrolyte layer | Type of negative electrode active material | Type of insulating Material | Formation surface of electrolyte layer | Type of negative electrode active material | Open circuit voltage [V] | Capacitance retention rate [%] | Thickness change [%] |
| Example 10 | Si, Artificial graphite | Negative electrode side | Artificial graphite | — | Positive electrode side | — | 4.20 | 86 | 7 |
| Example 11 | Sn | Negative electrode side | Artificial graphite | — | Positive electrode side | — | 4.20 | 82 | 8 |
| Example 12 | Artificial graphite | Separator side | Artificial graphite | — | Separator side | — | 4.20 | 88 | 6 |
| Example 13 | Artificial graphite | Negative electrode side | Artificial graphite | Alumina | Positive electrode side | — | 4.20 | 89 | 3 |
| Example 14 | Artificial graphite | Negative electrode side | Artificial graphite | — | Positive electrode side | — | 4.35 | 96 | 4 |
| Example 15 | Artificial graphite | Negative electrode side | Artificial graphite | — | Positive electrode side | — | 4.40 | 95 | 4 |
| Example 16 | Artificial graphite | Negative electrode side | Artificial graphite | — | Positive electrode side | — | 4.45 | 95 | 5 |
| Comparative Example 1 | Artificial graphite | Negative electrode side | — | — | Positive electrode side | — | 4.20 | 73 | 12 |
| Comparative Example 2 | Si | Negative electrode side | — | — | Positive electrode side | — | 4.20 | 33 | 35 |
| Comparative Example 3 | Si, Artificial graphite | Negative electrode side | — | — | Positive electrode side | — | 4.20 | 38 | 40 |
| Comparative Example 4 | Sn | Negative electrode side | — | — | Positive electrode side | — | 4.20 | 40 | 30 |
| Comparative Example 5 | Artificial graphite | Negative electrode side | Artificial graphite | — | Positive electrode side | Artificial graphite | 4.20 | Charge unavailable | — |
| Comparative Example 6 | Artificial graphite | Separator side | Artificial graphite | — | Separator side | Artificial graphite | 4.20 | Charge unavailable | — |
| Comparative Example 7 | Artificial graphite | Negative electrode side | — | Alumina | Positive electrode side | — | 4.20 | 75 | 10 |
| Comparative Example 8 | Artificial graphite | Negative electrode side | — | — | Positive electrode side | — | 4.35 | 62 | 20 |
| Comparative Example 9 | Artificial graphite | Negative electrode side | — | — | Positive electrode side | — | 4.40 | 59 | 23 |
| Comparative Example 10 | Artificial graphite | Negative electrode side | — | — | Positive electrode side | — | 4.45 | 52 | 27 |

In the battery (Examples 1 and 3) including the gel electrolyte layer containing graphite as the negative electrode active material on the negative electrode side, a cycle retention rate can be improved, and a thickness change (the swelling of the battery) can also be suppressed, compared to the battery (Comparative Example 2) not including such a gel electrolyte layer on the negative electrode side. This is because it is difficult for the negative electrode active material to be isolated at the time of a low temperature cycle, and thus, a decrease in the electric conductivity is suppressed, and the precipitation of Li is suppressed at the time of the low temperature cycle.

In the battery (Examples 4 to 6) using the gel electrolyte layer containing a metal oxide, such as lithium titanate or silicon oxide, as the negative electrode active material, and a metal such as a silicon alloy, the cycle retention rate can be improved, and the thickness change can also be suppressed, similar to the battery (Examples 1 and 3) using the gel electrolyte layer containing graphite as the negative electrode active material.

In the battery (Examples 2 and 7) including the gel electrolyte layer containing the negative electrode active material on the positive electrode side, the cycle retention rate can be improved, and the thickness change can also be suppressed, similar to the battery (Examples 1 and 4) including such a gel electrolyte layer on the negative electrode side. This is because it is difficult for the positive electrode active material to be isolated at the time of the low temperature cycle, and thus, a decrease in the electric conductivity is suppressed, and the precipitation of Li is suppressed at the time of the low temperature cycle.

In the battery (Example 13) in which the gel electrolyte layer is formed by applying the active material-containing solution onto the separator, the cycle retention rate can be improved, and the thickness change can also be suppressed, similar to the battery (Examples 1 and 2) in which the gel electrolyte layer is formed by applying the active material-containing solution onto the positive electrode or the negative electrode.

In the battery (Example 8) in which the gel electrolyte layer containing a metal oxide (lithium titanate) as the negative electrode active material is formed on both of the negative electrode side and the positive electrode side, the cycle retention rate can be improved, and the thickness change can also be suppressed, similar to the battery (Examples 4 and 7) in which the gel electrolyte layer containing a metal oxide as the negative electrode active material is formed on the positive electrode side or the negative electrode side. On the other hand, in the battery (Comparative Examples 5 and 6) in which the gel electrolyte layer containing a carbon material (graphite) as the negative electrode active material is formed on both of the negative electrode side and the positive electrode side, short-circuit occurs between the positive electrode and the negative electrode, and thus, the charge and discharge of the battery is not capable of being performed. It is considered that the short-circuit does not occur in the battery in which the gel electrolyte layer containing a metal oxide (lithium titanate) as the negative electrode active material is formed on both of the negative electrode side and the positive electrode side, since the metal oxide (lithium titanate) relates to representing a noble potential compared to a carbon material (graphite).

In a case where a battery in which an open circuit voltage per a pair of the positive electrode and the negative electrode in a fully charged state is greater than or equal to 4.35 V, includes the gel electrolyte layer containing the negative electrode active material layer, the effect of improving the cycle retention rate and of suppressing the thickness change is considerable (Examples 1, 14 to 16, Comparative Examples 2, and Comparative Examples 8 to 10)

As described above, the embodiments of the present technology have been described in detail, but the present technology is not limited to the embodiments described above, and various modifications based on the technical idea of the present technology can be performed.

For example, the configuration, the method, the step, the shape, the material, the numerical value, and the like in the embodiments described above are merely examples, and as necessary, a configuration, a method, a step, a shape, a material, a numerical value, and the like, which are different from those described in the embodiments, may be used.

In addition, the configuration, the method, the step, the shape, the material, the numerical value, and the like in the embodiments described above can be combined with each other, unless deviating from the gist of the present technology.

In addition, the present technology is capable of adopting the following configurations.

(1)
A battery, including:
a positive electrode;
a negative electrode; and
an electrolyte layer containing a negative electrode active material.

(2)
The battery according to (1),
in which the electrolyte layer contains an electrolytic solution and a polymer compound, and
the electrolytic solution is retained by the polymer compound.

(3)
The battery according to (2),
in which the polymer compound is a polymer compound containing fluorine.

(4)
The battery according to any one of (1) to (3),
in which a negative electrode active material contained in the electrolyte layer and a negative electrode active material contained in the negative electrode have different compositions.

(5)
The battery according to any one of (1) to (4),
in which the electrolyte layer further contains at least one type of an insulating material and a conductive assistant.

(6)
The battery according to any one of (1) to (5),
in which the negative electrode active material contains at least one type of a carbon material, a metal, a semimetal, a metal oxide, a semimetal oxide, and a polymer compound.

(7)
The battery according to any one of (1) to (5),
in which the negative electrode active material contains at least one type of a carbon material, silicon (Si), tin (Sn), and lithium titanate.

(8)
The battery according to any one of (1) to (5),
in which the negative electrode active material contains a carbon material, and
the carbon material is graphite having a specific surface area of greater than or equal to 0.1 $m^2/g$ and less than or equal to 50 $m^2/g$.

(9)
The battery according to any one of (1) to (8),
in which the electrolyte layer is adjacent to one electrode of the positive electrode and the negative electrode, and is separated from the other electrode.

(10)
The battery according to any one of (1) to (8),
in which the electrolyte layer includes a first electrolyte layer which is adjacent to the positive electrode, and a second electrolyte layer which is adjacent to the negative electrode, and
one of the first electrolyte layer and the second electrolyte layer contains the negative electrode active material.

(11)
The battery according to any one of (1) to (5),
in which the electrolyte layer includes a first electrolyte layer which is adjacent to the positive electrode, and a second electrolyte layer which is adjacent to the negative electrode,
both of the first electrolyte layer and the second electrolyte layer contain the negative electrode active material, and
the negative electrode active material contains a metal oxide.

(12)
The battery according to (11),
in which the metal oxide is lithium titanate.

(13)

The battery according to any one of (1) to (9), further including;
a separator,
in which the electrolyte layer is disposed between the negative electrode and the separator or between the negative electrode and the separator.

(14)

The battery according to any one of (1) to (13), further including:
a separator,
in which the electrolyte layer is formed on the separator, the positive electrode, or the negative electrode.

(15)

The battery according to any one of (1) to (13),
in which the negative electrode active material is dispersed in the electrolyte layer.

(16)

The battery according to any one of (1) to (15),
in which an open circuit voltage per a pair of the positive electrode and the negative electrode in a fully charged state is greater than or equal to 4.35 V.

(17)

A battery pack, including:
the battery according to any one of (1) to (16); and
a control unit controlling the battery.

(18)

An electronic device, including:
the battery according to any one of (1) to (16),
in which the electronic device receives power from the battery.

(19)

An electric vehicle, including:
the battery according to any one of (1) to (16);
a conversion device converting power received from the battery into a driving force of the vehicle; and
a control device performing information processing relevant to vehicle control on the basis of information relevant to the battery.

(20)

An electric storage device, including:
the battery according to any one of (1) to (16),
in which power is supplied to an electronic device connected to the battery.

(21)

A power system, including:
the battery according to any one of (1) to (16),
in which the power system receives power from the battery.

REFERENCE SIGNS LIST

11 Battery can
12, 13 Insulating plate
14 Battery lid
15 Safety valve mechanism
15A Disk plate
16 Positive temperature coefficient element
17 Gasket
20 Wound electrode body
21, 33 Positive electrode
21A, 33A Positive electrode collector
21B, 33B Positive electrode active material layer
22, 34 Negative electrode
22A, 34A Negative electrode collector
22B, 34B Negative electrode active material layer
23, 35 Separator
24 Center pin
25, 31 Positive electrode lead
26, 32 Negative electrode lead
27, 28 Electrolyte layer
30 Wound electrode body
36, 37 Electrolyte layer
38 Protective tape
40 Exterior member
41 Cohesive film
100 Electric storage system
200 Hybrid vehicle
300 Battery pack
400 Electronic device

The invention claimed is:

1. A battery, comprising:
a positive electrode;
a negative electrode;
a first electrolyte layer positioned adjacent to the positive electrode;
a second electrolyte layer positioned adjacent to the negative electrode; and
a separator positioned between the first electrolyte layer and the second electrolyte layer,
wherein one or both of the first and the second electrolyte layers comprises a negative electrode active material, and
wherein the positive electrode and the negative electrode are laminated through the separator.

2. The battery according to claim 1,
wherein one or both of the first and the second electrolyte layers contains an electrolytic solution and a polymer compound, and
the electrolytic solution is retained by the polymer compound.

3. The battery according to claim 2,
wherein the polymer compound is a polymer compound containing fluorine.

4. The battery according to claim 1,
wherein the negative electrode active material contained in one or both of the first and second the electrolyte layers and a negative electrode active material contained in the negative electrode have different compositions.

5. The battery according to claim 1,
wherein one or both of the first and the second electrolyte layers further comprises at least one type of an insulating material and a conductive assistant.

6. The battery according to claim 1,
wherein the negative electrode active material contains at least one type of a carbon material, a metal, a semimetal, a metal oxide, a semimetal oxide, and a polymer compound.

7. The battery according to claim 1,
wherein the negative electrode active material contains at least one type of a carbon material, silicon (Si), tin (Sn), and lithium titanate.

8. The battery according to claim 1,
wherein the negative electrode active material contains a carbon material, and
the carbon material is graphite having a specific surface area of greater than or equal to $0.1$ $m^2/g$ and less than or equal to $50$ $m^2/g$.

9. The battery according to claim 1,
wherein the first electrolyte layer is disposed between the positive electrode and the separator.

10. The battery according to claim 1,
wherein the first electrolyte layer or the second electrolyte layer contains the negative electrode active material.

11. The battery according to claim 1, wherein
both of the first electrolyte layer and the second electrolyte layer contain the negative electrode active material, and
the negative electrode active material contains a metal oxide.

12. The battery according to claim 11, wherein the metal oxide is lithium titanate.

13. The battery according to claim 1, wherein the second electrolyte layer is disposed between the negative electrode and the separator.

14. The battery according to claim 1, wherein the second electrolyte layer is formed on the separator or on the negative electrode.

15. The battery according to claim 1,
wherein the negative electrode active material is dispersed in one or more of the first and the second electrolyte layers.

16. The battery according to claim 1,
wherein an open circuit voltage per a pair of the positive electrode and the negative electrode in a fully charged state is greater than or equal to 4.35 V.

17. A battery pack, comprising:
the battery according to claim 1; and
a control unit controlling the battery.

18. An electronic device, comprising:
the battery according to claim 1,
wherein the electronic device receives power from the battery.

19. An electric vehicle, comprising:
the battery according to claim 1;
a conversion device converting power received from the battery into a driving force of the vehicle; and
a control device performing information processing relevant to vehicle control on the basis of information relevant to the battery.

20. An electric storage device, comprising:
the battery according to claim 1,
wherein power is supplied to an electronic device connected to the battery.

21. A power system, comprising:
the battery according to claim 1,
wherein the power system receives power from the battery.

* * * * *